(12) United States Patent
Kamada

(10) Patent No.: US 6,340,338 B1
(45) Date of Patent: Jan. 22, 2002

(54) BICYCLE SPROCKET

(75) Inventor: Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/661,201

(22) Filed: Sep. 13, 2000

(51) Int. Cl.[7] .............................................. F16H 55/30
(52) U.S. Cl. ....................................... 474/160; 474/152
(58) Field of Search ................................ 474/148, 152, 474/157, 158, 160

(56) References Cited

U.S. PATENT DOCUMENTS

| 4,889,521 | A | | 12/1989 | Nagano | |
|---|---|---|---|---|---|
| 4,946,425 | A | * | 8/1990 | Bühlmann | 474/80 |
| 5,085,620 | A | * | 2/1992 | Nagano | 474/152 |
| 5,192,249 | A | | 3/1993 | Nagano | |
| 5,503,598 | A | * | 4/1996 | Neurer et al. | 474/78 |
| 5,545,096 | A | * | 8/1996 | Su | 474/160 |
| 6,007,442 | A | * | 12/1999 | Schmidt | 474/122 |
| 6,013,001 | A | * | 1/2000 | Miyoshi | 474/160 |
| 6,015,159 | A | | 1/2000 | Matsuo | |
| 6,045,472 | A | | 4/2000 | Sung et al. | |
| 6,073,061 | A | | 6/2000 | Kimura | |
| 6,139,456 | A | * | 10/2000 | Lii et al. | 474/152 |

FOREIGN PATENT DOCUMENTS

| EP | 0 689 988 B1 | 11/1997 |
|---|---|---|
| JP | 2-189296 | 7/1990 |

* cited by examiner

Primary Examiner—David A. Bucci
Assistant Examiner—Timothy McAnulty
(74) Attorney, Agent, or Firm—Shinjyu Global IP Counselors, LLP

(57) ABSTRACT

A sprocket assembly for a bicycle is provides with at least one large sprocket and at least one small sprocket. The large sprocket is modified to allow a bicycle chain to move smoothly from the large sprocket to the small sprocket during an up shift operation. The large sprocket basically has a sprocket body with a first axial side and a second axial side, and a plurality of circumferentially spaced teeth extending radially and outwardly from an outer periphery of the sprocket body. The teeth of the sprocket include a plurality of up shift teeth. The up shift teeth has at least a first up shift tooth, a second up shift tooth located adjacent the first up shift tooth and a third up shift tooth located adjacent the second up shift tooth. The first, second and third up shift teeth are dimensioned to maintain alignment of a bicycle chain to prevent an up shift of the chain when an outer link plate of the bicycle chain meshes with the second up shift tooth, and to permit an up shift the bicycle chain when an inner link plate meshes with the second up shift tooth along a first up shift path.

48 Claims, 20 Drawing Sheets

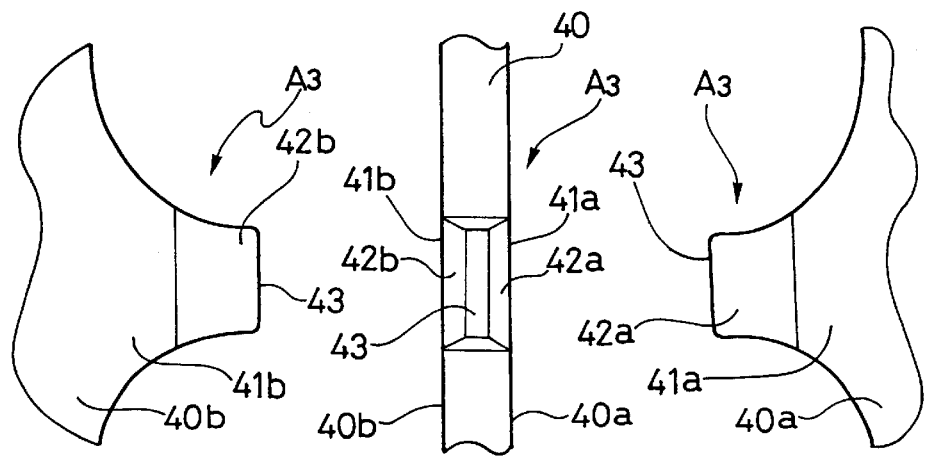
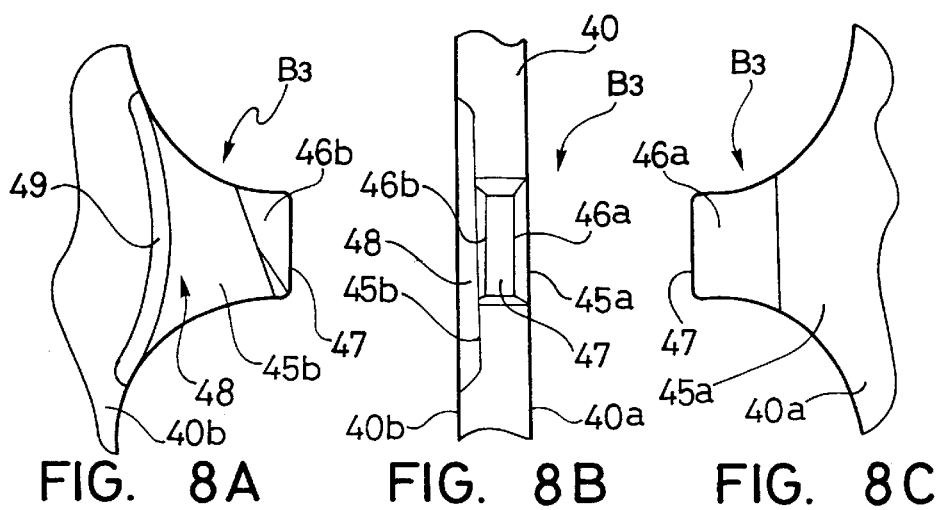
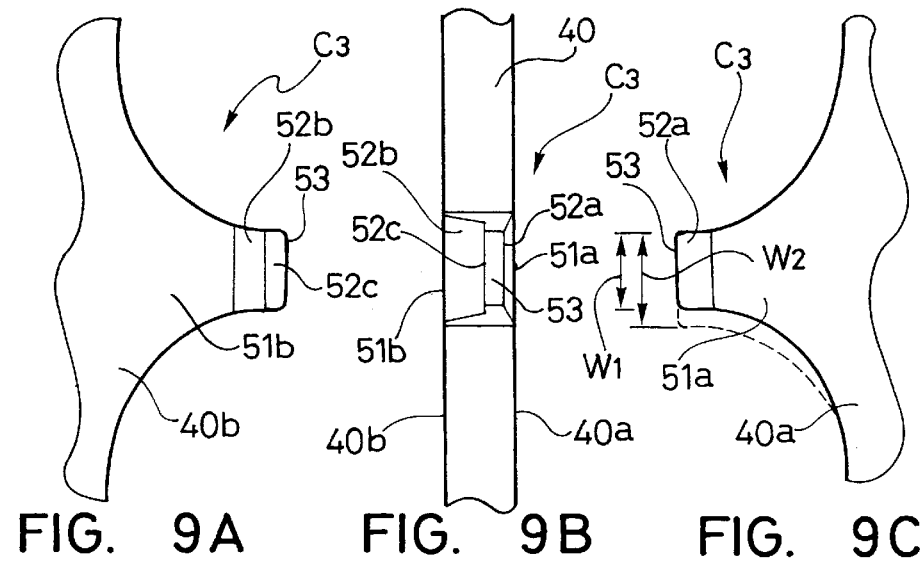

BICYCLE SPROCKET

BACKGROUND OF THE INVENTION

1. Field of the Invention

This invention generally relates to a multistage sprocket assembly for a bicycle. More specifically, the present invention relates to a sprocket assembly having at least one larger diameter sprocket and at least one smaller diameter sprocket with the teeth of at least the one larger diameter sprocket being dimensioned to allow for smoother shifting of the bicycle chain between the smaller sprocket and the larger sprocket.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. The drive train of the bicycle has been redesigned over the past years. Specifically, manufacturers of bicycle components have been continually improving shifting performance of the various shifting components such as the shifter, the shift cable, the derailleur, the chain and the sprocket.

One particular component of the drive train that has been extensively redesigned is the sprocket assembly for the bicycle. More specifically, the bicycle sprocket assembly has been improved to provide smoother shifting.

Conventionally, a multistage sprocket assembly includes a smaller diameter sprocket and a larger diameter sprocket assembled such that: (1) the center point between a pair of adjacent teeth at the larger diameter sprocket and the center point between a pair of adjacent teeth at the smaller diameter sprocket are positioned on the tangent extending along the chain path; (2) a distance between the aforesaid center points is an integer multiple of the chain pitch; and (3) a first tooth of the larger diameter sprocket positioned behind the center point between the adjacent teeth at the larger diameter sprocket in the rotation direction for driving the bicycle is made to be easily engageable with the driving chain, thereby improving the speed change efficiency when the driving chain is shifted from the smaller diameter sprocket to the larger diameter sprocket.

The drive chain is a continuous loop that has a plurality of inner link plates and a plurality of outer link plates that are pivotally connected to each other by articulation pins and rollers. The space between the opposite surfaces of each pair of inner link plates is smaller than that between the opposite surfaces of each pair of outer link plates. In other words, each pair of the outer link plates is positioned outside the inner link plates and forms a space larger in width, while each pair of the inner link plates is positioned inside the outer link plates and form a space smaller in width.

The driving chain constructed as described above is biased by a derailleur toward either a larger diameter sprocket or a smaller diameter sprocket so as to be shifted thereto. Specifically, during a chain shifting process, the chain is shifted from one sprocket to the next adjacent sprocket by the rear derailleur moving the chain in an axial direction relative to the axis of rotation of the sprockets. By modifying the teeth of the large sprocket, the chain can execute smooth down shifting or up shifting motions. An up shift occurs when the chain is moved from a large sprocket to the next smaller sprocket. A down shift occurs when the chain is shifted from a small sprocket to the next larger sprocket.

Basically, when the sprocket assembly is rotated in a driving direction, the inner and outer link plates engage the teeth of one of the sprockets. In the case of a sprocket with an even number of teeth, the inner and outer link plates will always engage the same teeth. In the case of a sprocket with an odd number of teeth, the inner and outer link plates will alternately engage different teeth with each rotation of the sprocket assembly. Therefore, the teeth of the sprockets will alternately engage both the inner and outer link plates. The teeth of a sprocket with an odd number of teeth are typically designed to accommodate shifting with either the inner or outer link plates engaging the up shift teeth. Thus, the teeth of the sprocket must have one shift path for the inner link plates and another shift path for the outer link plates. If the chain is shifted on the wrong shift path, the rider will most like experience pedaling shock.

One example of an improved sprocket assembly is disclosed in U.S. Pat. No. 4,889,521 to Nagano. While the sprocket assembly disclosed in the Nagano patent operates very well in shifting from a smaller sprocket to a larger sprocket, no provision has been made for shifting from a large sprocket to a small sprocket. Moreover, Shimano introduced the Interactive Glide (IG) sprocket with the basic design of Shimano's HyperGlide (HG) sprocket plus uses new ramps and teeth configurations to control up shifts.

One example of a sprocket incorporating up shifting and downshifting paths is disclosed in U.S. Pat. No. 6,045,472 to Sung et al. The Sung et al. patent shows a sprocket designed to have two up shifting paths adjacent to each other. The Interactive Glide (IG) sprocket also has two up shift paths because of a combination problem of a sprocket with an even number of teeth and the outer link plates of the chain. In order to solve this problem, two up shifting paths were arranged adjacent so that one of the up shifting paths contributed for up shifting depending on the combination of the inner and outer links of the chain contacting the teeth of the sprocket.

More specifically, referring to FIG. 3 of the Sung et al. patent, when the outer link plate of the chain meshes with tooth 13, the inner link plate of the chain is guided by 4B. However, when the outer link plate of the chain meshes with tooth 14, the inner link plate of the chain is guided by 4C. Accordingly, design of 4B and 4C are different. The radial position of 4C is higher than 4B to take up slack of the chain from the second up shift escape point to a second up shift engagement point. Consequently, up shifting performance in the first up shift path and the adjacent second up shift path is different. One up shift path is superior to the other up shift path and such superior up shifting is so smooth that pedaling shock can be prevented. However, the other up-shift path is not so smooth and pedaling shock can occur.

In the course of up shifting the chain from the large sprocket to the small sprocket, the chain may ride on a tooth crest of either the small or large sprocket thus interfering with the chain shift without proper phase arrangement between the teeth of the large and small sprockets. If this happens, the rider will most like experience pedaling shock.

In view of the above, there exists a need for an improved sprocket assembly assuring smooth and reliable chain shift action from the large sprocket to the small sprocket. This invention addresses this need in the prior art as well as other needs, which will become apparent to those skilled in the art from this disclosure.

SUMMARY OF THE INVENTION

One object of the present invention is to provide a sprocket that is designed to provide a superior up shifting path by modifying the sprocket teeth to assure smooth and reliable chain shift action from the large sprocket to the small sprocket.

The rider can enjoy smooth up shifting without pedal shock during up shifting with a derailleur. This improved multiple sprocket assembly has special advantages when used with motorized automatic shifting mechanisms.

One object of the present invention is to provide a large sprocket that provides a smooth up shifting action between a large sprocket to a small sprocket.

Another object of the present invention is to provide a sprocket assembly with at least one large sprocket and at least one small sprocket for shifting a chain from the large sprocket to the small sprocket relatively easily and reliably even under a heavy drive load.

The foregoing objects of the present invention can be attained by providing a large sprocket basically having a sprocket body with a first axial side and a second axial side, and a plurality of circumferentially spaced teeth extending radially and outwardly from an outer periphery of the sprocket body. The teeth of the sprocket include a plurality of up shift teeth. The up shift teeth has at least a first up shift tooth, a second up shift tooth located adjacent the first up shift tooth and a third up shift tooth located adjacent the second up shift tooth. The first, second and third up shift teeth are dimensioned to maintain alignment of a bicycle chain to prevent an up shift of the chain when an outer link plate of the bicycle chain meshes with the second up shift tooth, and to permit an up shift the bicycle chain when an inner link plate meshes with the second up shift tooth along a first up shift path.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7A is a partial, large sprocket side elevational view of the first up shift tooth of the fifteen teeth sprocket illustrated in FIGS. 5 and 6;

FIG. 7B is a partial, overhead plan view of the first up shift tooth illustrated in FIG. 7A for the fifteen teeth sprocket illustrated in FIGS. 5 and 6;

FIG. 7C is a partial, small side sprocket elevational view of the first up shift tooth illustrated in FIGS. 7A and 7B for the fifteen teeth sprocket illustrated in FIGS. 5 and 6;

FIG. 8A is a partial, large sprocket side elevational view of the second up shift tooth of the fifteen teeth sprocket illustrated in FIGS. 5 and 6;

FIG. 8B is a partial, overhead plan view of the second up shift tooth illustrated in FIG. 8A for the fifteen teeth sprocket illustrated in FIGS. 5 and 6;

FIG. 8C is a partial, small sprocket side elevational view of the second up shift tooth illustrated in FIGS. 8A and 8B for the fifteen teeth sprocket illustrated in FIGS. 5 and 6;

FIG. 9A is a partial, large sprocket side elevational view of the third up shift tooth of the fifteen teeth sprocket illustrated in FIGS. 5 and 6;

FIG. 9B is a partial, overhead plan view of the third up shift tooth illustrated in FIG. 9A for the fifteen teeth sprocket illustrated in FIGS. 5 and 6;

FIG. 9C is a partial, small sprocket side elevational view of the third up shift tooth illustrated in FIGS. 9A and 9B for the fifteen teeth sprocket illustrated in FIGS. 5 and 6;

DETAILED DESCRIPTION OF THE PREFERRED EMBODIMENTS

Figure 1A:
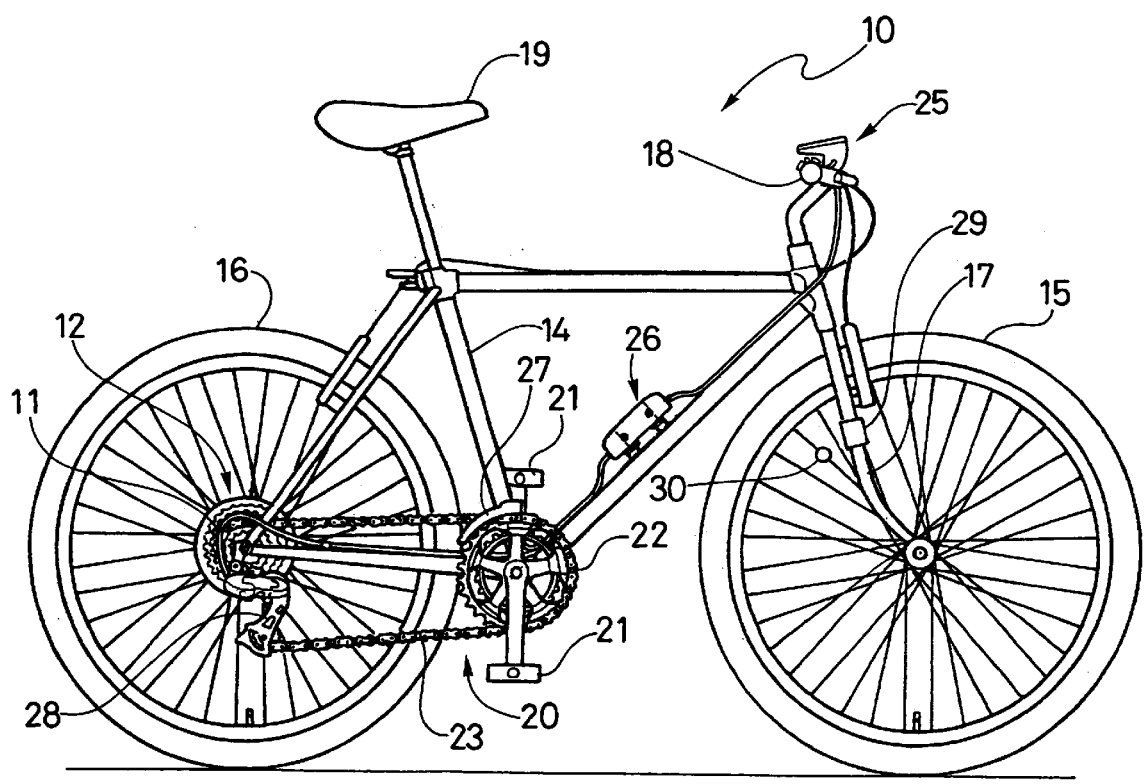
FIG. 1A is a side elevational view of a bicycle having a rear wheel with a sprocket assembly in accordance with the present invention.

Referring initially to FIG. 1A, a conventional bicycle 10 is illustrated with a rear bicycle hub 11 having a multi-stage sprocket assembly 12 in accordance with the present invention. The bicycle 10 basically has a frame 14 with front and rear wheels 15 and 16 rotatably coupled thereto. A front fork 17 is coupled between the frame 14 and the front wheel 15 in a conventional manner. Turning a handlebar 18, which is fixedly coupled to the front fork 17, turns the front wheel 15. The rear wheel 16 is rotatably coupled to a rear portion of the frame 14. The frame 14 also has a seat 19 adjustably coupled to frame 14 and a drive train 20 for propelling bicycle 10.

The drive train 20 basically includes the rear multi-stage sprocket assembly 12 of the present invention, a pair of pedals 21, a front multi-stage sprocket assembly 22 mounted to rotate with the pedals 21, and a chain 23 extending between the rear multi-stage sprocket assembly 12 and the front multi-stage sprocket assembly 22. The drive train 20 is basically operated by an electronically controlled automatic shifting assembly. The electronically controlled automatic shifting assembly basically includes a shift control unit 25, a junction box or connection unit 26, a motorized front derailleur 27, and a motorized rear derailleur or chain shifting device 28. The shift control unit 25 includes a microcomputer formed on a printed circuit board that is powered by a battery unit. The microcomputer of shift control unit 25 includes a central processing unit (CPU), a random access memory component (RAM), a read only memory component (ROM), and an I/O interface. The shift control unit 25 is preferably automatic as discussed in more detail below. The various components of the microcomputer are well known in the bicycle field. Therefore, the components used in the microcomputer of the shift control unit 25 will not be discussed or illustrated in detail herein. Moreover, it will be apparent to those skilled in the art from this disclosure that the shift control unit 25 can include various electronic components, circuitry and mechanical components to carryout the present invention.

Figure 1B:
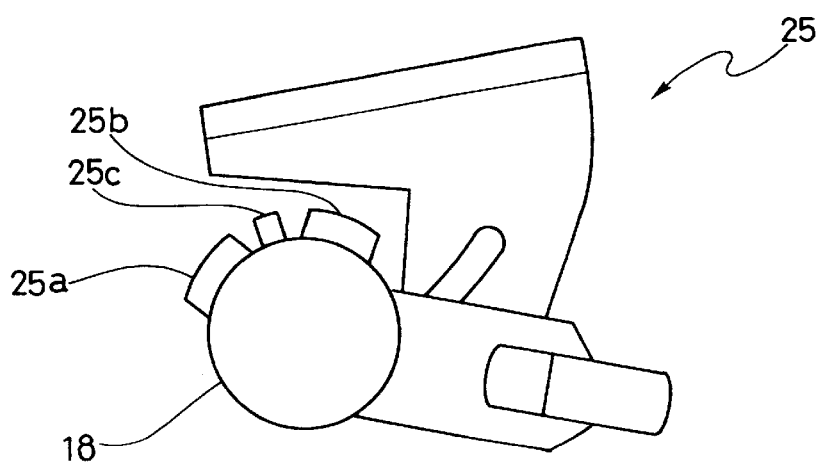
FIG. 1B is an enlarged partial, side elevational view of the handlebar and shift control unit of the bicycle illustrated in FIG. 1 showing manual up shift and down shift controls.

The shift control unit 25 also preferably includes manual down and up shift buttons or levers 25a and 25b, respectively, for manually operating the front and/or rear derailleurs 27 and 28, as seen in FIG. 1B. A protrusion 25c is arranged between buttons 25a and 25b to provide a reference point for the rider's thumb or finger relative to buttons 25a and 25b. The shift control unit 25 further includes at least one sensing/measuring device or component that provides information to its central processing unit. The sensing/measuring component generates predetermined operational commands. Thus, the sensing/measuring components are operatively coupled to central processing unit of the shift control unit 25 such that predetermined operational commands are received by the central processing unit (CPU).

The shift control unit 25 sends a signal to the front derailleur 27 and/or rear derailleur 28 via connection unit 26 for automatic shifting. The connection unit preferably includes a single power input for receiving signals from the shift control unit 25 and a pair of power outputs for sending signals to the front and/or rear derailleurs 27 and 28. The power input operatively couples the shift control unit 25 to the connection unit 26. Preferably, one power output operatively couples front derailleur 27 to connection unit 26 and the other power output operatively couples to rear derailleur 28 to connection unit 26.

One type of sensing/measuring component that can be used to operate the shift control unit 25 is a speed sensing unit. The shift control unit 25, and the connection unit 26 are operatively coupled to the speed sensing unit, which includes a sensor 29 and a magnet 30. The sensor 29 is preferably a magnetically operable sensor that is mounted on the front fork 17 and senses the magnet 30 that is attached to one of the spokes of the front wheel 15. Thus, speed information is sent to the battery operated electronic shift control unit 25. The bicycle speed sensor 29 is coupled to the front fork 17 of bicycle 10. This bicycle speed sensor 29 outputs a bicycle speed signal by detecting a magnet 30 mounted on the front wheel 15. The sensor 29 has a front read switch or other component for detecting the magnet 30 rotating with the wheel 15. Sensor 29 generates a pulse each time wheel 15 has turned a pre-described angle or rotation. As soon as sensor 29 generates the pulse or signal, a pulse signal transmission circuit sends this pulse signal to the central processing unit of the shift control unit 25 to determine whether the chain 23 should be up shifted or down shifted. Thus, the sensor 29 and the magnet 30 form a sensing device or measuring component of the shift control unit 25. In other words, the sensor 29 detects the rotational velocity of the front wheel 15.

The multiple sprocket assembly 12 of the present invention is especially useful when used in conjunction with the automatic shifting assembly that operates the motorized rear derailleur 28. One example of an automatic shifting assembly that can be utilized with the present invention is disclosed in U.S. Pat. No. 6,073,061 to Kimura, which is assigned to Shimano Inc.

In such a device, when the bicycle speed exceeds a predetermined upper speed value, then the automatic shifting assembly actuates the rear derailleur 28 to move the chain 23 in an up shifting direction. When the bicycle speed becomes lower than a predetermined lower speed value, then the automatic shifting assembly actuates the rear derailleur 28 to move the chain 23 in a down shifting direction. When the automatic shifting assembly is set to manual shifting, the rider can anticipate when is the best time to shift the rear derailleur 28 so as to minimize sudden pedaling shock. However, when the automatic shifting assembly is in the automatic mode, the rider cannot predict when the shifting will occur. Therefore, the rider cannot prevent the rear derailleur 28 from shifting at a point when sudden pedaling shock is highly likely. However, using the multiple sprocket assembly 12 of the present invention, sudden pedaling shock is reduced or eliminated even when the automatic shifting assembly is in the automatic shifting mode.

Since the parts of the bicycle 10 and the drive train 20 are well known in the bicycle art, these parts of the bicycle 10 will not be discussed or illustrated in detail herein, except as they are modified in accordance with the present invention. Moreover, various conventional bicycle parts such as brakes, additional sprockets, etc., which are not illustrated and/or discussed in detail herein, can be used in conjunction with the present invention.

As used herein, the terms "forward, rearward, above, below, lateral and transverse" refer to those directions of a bicycle in its normal riding position, to which the sprocket assembly 12 is attached. Accordingly, these terms, as utilized to describe the sprocket assembly 12 in the claims, should be interpreted relative to bicycle 10 in its normal riding position.

FIRST EMBODIMENT

Figure 2:
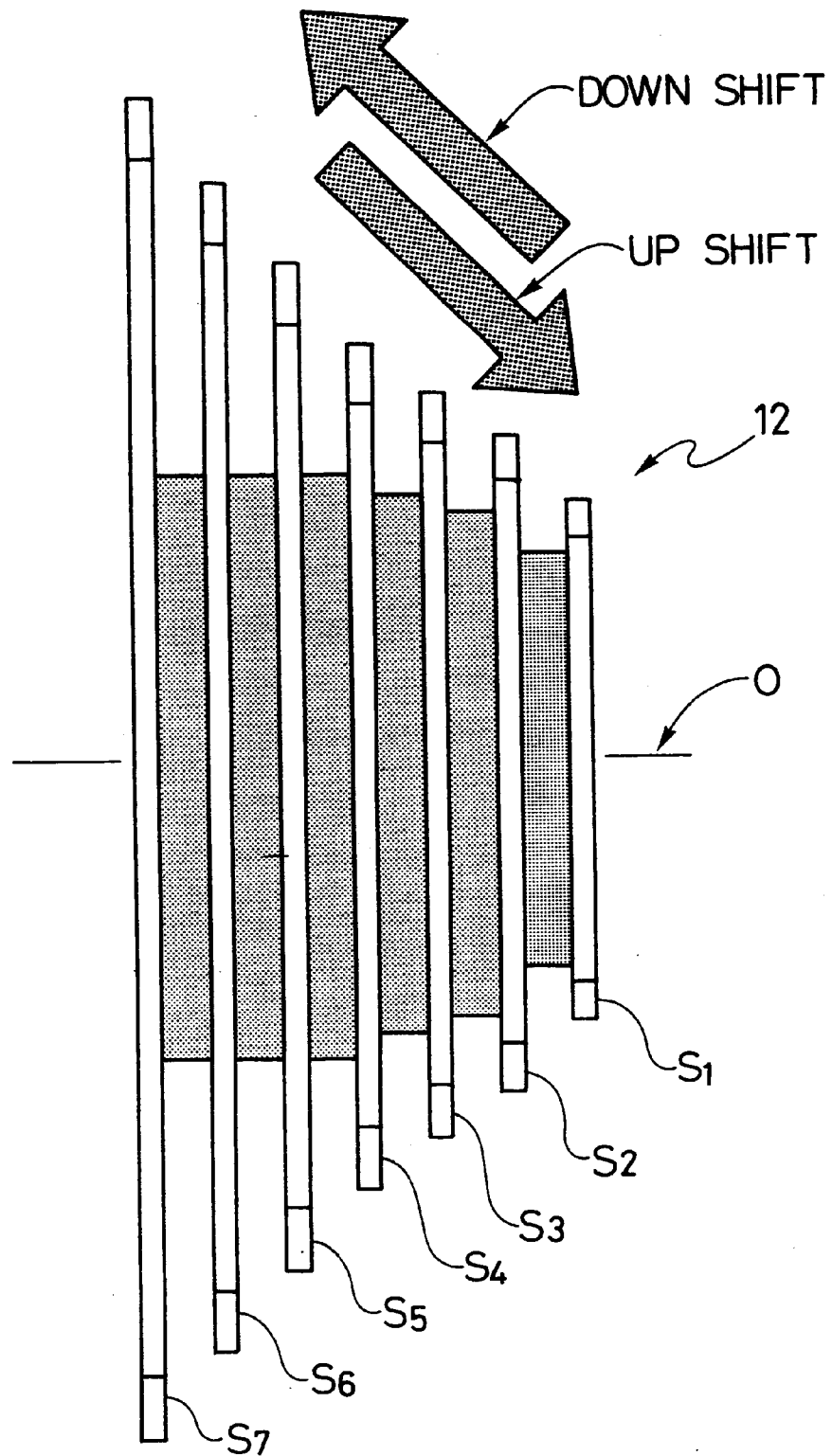
FIG. 2 is a rear diagrammatic elevational view of the seven-stage sprocket assembly according to the present invention.
Figure 3:
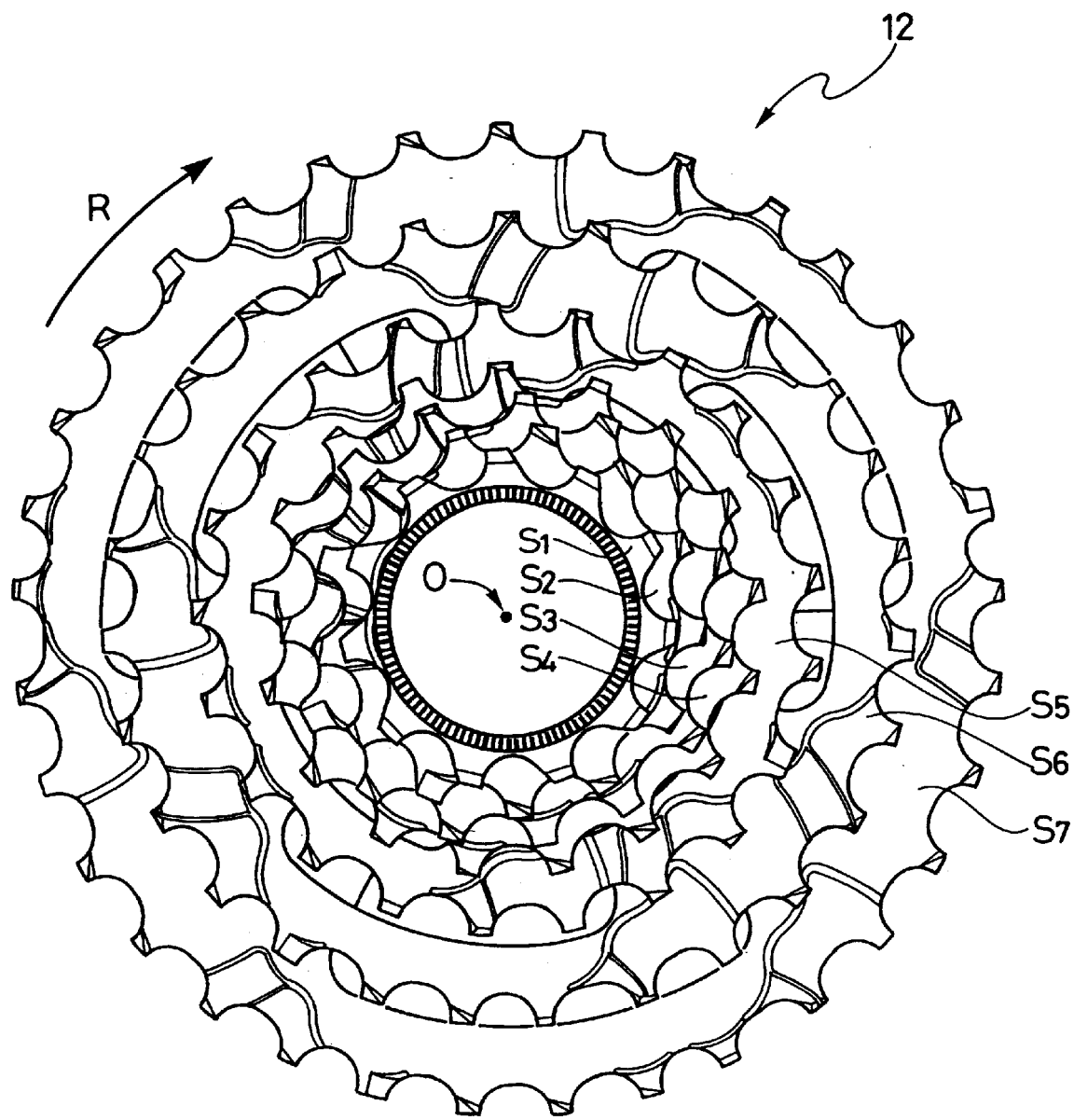
FIG. 3 is a side elevational view of the seven-stage sprocket assembly in accordance with the present invention.

Referring now to FIGS. 2 and 3, the sprocket assembly 12 will now be discussed in accordance with a first embodiment of the present invention. In this first embodiment, the sprocket assembly 12 is a seven stage sprocket assembly with sprockets $S_1$–$S_7$ being spaced from each other at a predetermined interval. The sprockets $S_1$–$S_7$ are fixedly mounted on a freewheel 11 (not shown) of the rear hub in a conventional manner such that the sprockets $S_1$–$S_7$ rotate together about the center hub axis O. The sprockets $S_1$–$S_7$ rotate together in a clockwise direction R as view in FIG. 3.

It will be apparent to those skilled in the bicycle art from this disclosure that a sprocket assembly in accordance with the present invention can have fewer or more sprockets. In other words, the present invention can be any multi-stage sprocket assembly for a bicycle that uses a derailleur or the like, and which includes at least one large sprocket and at least one small sprocket.

Figure 4:
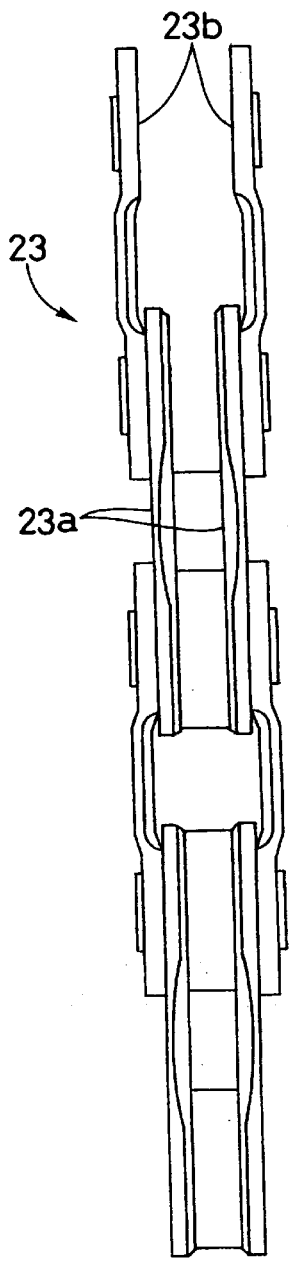
FIG. 4 is an enlarged partial top plan view of a portion of the chain that is used with the sprocket assembly illustrated in FIG. 3 in accordance with the present invention.

The multistage sprocket assembly 12 is adapted to engage with the drive chain 23, which is a conventional style bicycle chain as seen in FIG. 4. The drive chain 23 is a continuous loop that has a plurality of inner link plates 23a and a plurality of outer link plates 23b that are pivotally connected to each other by articulation pins and rollers. During a chain shifting process, the chain 23 is shifted from one sprocket to the next adjacent sprocket by the rear derailleur 28 moving the chain 23 in an axial direction relative to the axis of rotation of the sprockets $S_1$–$S_7$. By modifying the teeth of the large sprocket, the chain 23 can execute smooth down shifting or up shifting motions.

Referring now to FIG. 2, the sprocket assembly 12 is diagrammatically illustrated to show the directions of an up shift and a down shift. Specifically, an up shift occurs when the chain 23 is moved from a large sprocket to the next smaller sprocket. A down shift occurs when the chain 23 is shifted from a small sprocket to the next larger sprocket.

Basically, when the sprocket assembly 12 is rotated in a clockwise direction R as viewed in FIG. 3, the inner and outer link plates 23a and 23b engage the teeth of one of the sprockets. In the case of a sprocket with an even number of teeth, the inner and outer link plates 23a and 23b will always engage the same teeth. In the case of a sprocket with an odd number of teeth, the inner and outer link plates 23a and 23b will alternately engage different teeth with each rotation of the sprocket assembly 12. Therefore, the teeth of the sprockets $S_3$, $S_4$ and $S_5$ (all having an odd number of teeth) will alternately engage both the inner and outer link plates 23a and 23b. The teeth of the sprockets $S_3$, $S_4$ and $S_5$ are especially designed such that an up shift operation only occurs when one of the inner link plates 23 engages a selected tooth of the sprocket, as discussed below.

In first embodiment, the multistage sprocket assembly 12 of the invention has a teeth configuration of 11T-13T-15T-17T-21T-27T-33T for the sprockets $S_1$–$S_7$, respectively. Of course, it will be apparent to those skilled in the bicycle art from this disclosure that the sprockets $S_1$–$S_7$ can have other teeth configurations. The present invention is optimized for a sprocket having a total number of teeth equaling an odd number. Of course, it will be apparent to those skilled in the bicycle art that the sprockets of the present invention can be configured with a total number of teeth equaling an even number, as discussed below. The sprockets $S_1$–$S_7$ are preferably constructed of a suitable rigid material such as a metallic material.

The axial widths of the sprockets $S_1$–$S_7$ and the lateral spacing between the inner link plates 23a of the chain 23 are dimension to control the up shifting of the chain 23 as explained below. For example, the chain 23 has a lateral spacing between the inner link plates 23a of approximately 2.5 millimeters, while the sprockets $S_1$–$S_7$ preferably have an axial width of approximately 2.3 millimeters for the seven stage sprocket assembly 12. For an eight stage sprocket assembly (i.e., sprocket assembly 12' of the second embodiment), the axial width is preferably approximately 2.1 millimeters, as discussed in more detail.

For the sake of brevity, only the sprockets $S_3$, $S_4$ and $S_5$ will be discussed and/or illustrated in detail herein when discussing the first embodiment of bicycle sprocket assembly 12 in accordance with the present invention. Of course, it will be apparent to those skilled in the bicycle art that the principles of the present invention as discussed relative to sprockets $S_3$–$S_5$ can be applied to the other sprockets (i.e., $S_1$, $S_2$, $S_6$ and $S_7$) of the sprocket assembly 12.

Figure 5:
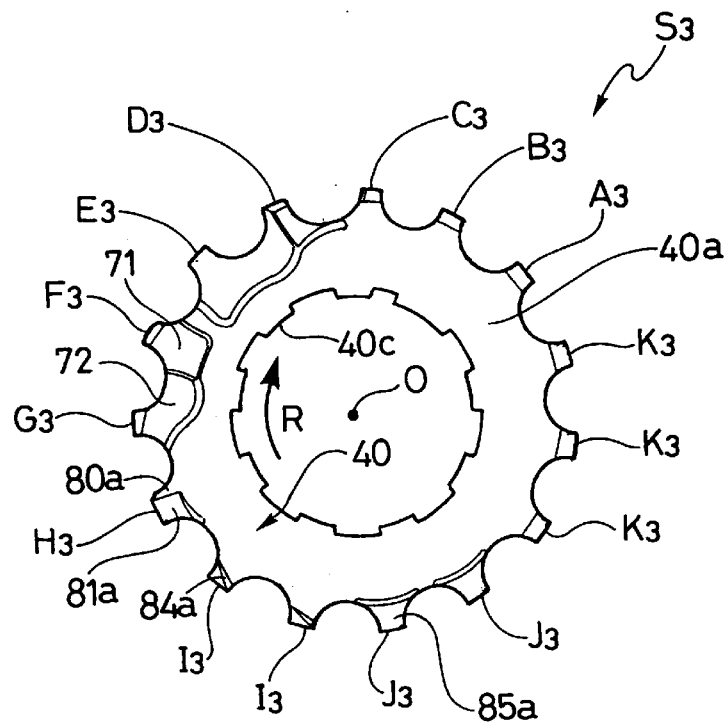
FIG. 5 is a small sprocket side elevational view of the fifteen teeth sprocket for the sprocket assembly illustrated in FIG. 3.
Figure 6:
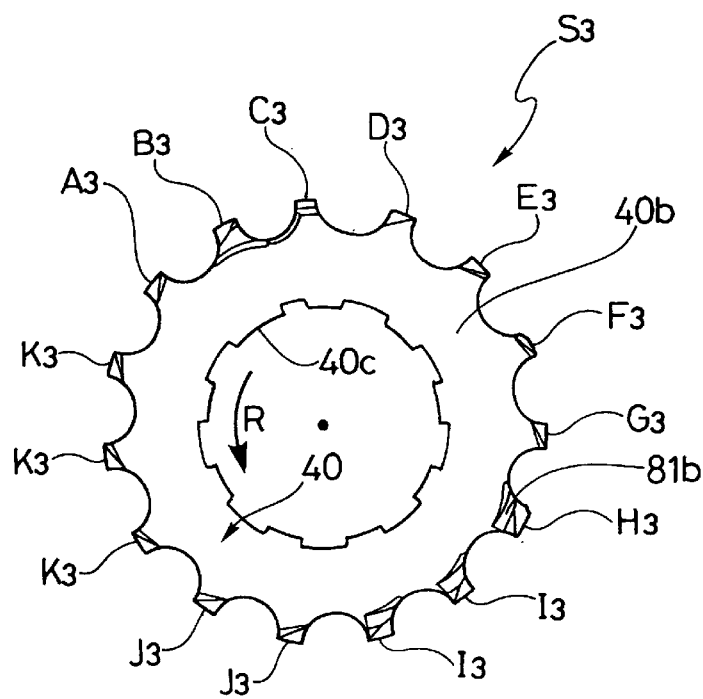
FIG. 6 is a large sprocket side elevational view of the fifteen teeth sprocket illustrated in FIG. 5 for the sprocket assembly illustrated in FIG. 3.

Referring now to FIGS. 5 and 6, the sprocket $S_3$ basically has a sprocket body 40 and a plurality (fifteen) of circumferentially spaced teeth $A_3$–$K_3$ extending radially and outwardly from an outer periphery of the sprocket body 40. The term "outer periphery of the sprocket body" as used herein lies on a circle that corresponds to the root diameter of teeth $A_3$–$K_3$. The sprocket body 40 has a first axial side or small sprocket side 40a that faces the next smaller sprocket $S_2$ and a second axial side or large sprocket side 40b that faces the next larger sprocket $S_4$. The center of the sprocket $S_3$ is provided with a splined bore 40c that is mounted on the freewheel 11 (not shown) of the rear hub in a conventional manner. For convenience sake, the teeth of the sprocket $S_3$ have been labeled alphabetically in a counterclockwise direction relative to the direction of rotation R of the sprocket $S_3$ with substantially identical teeth typically having the same reference character. The teeth of the sprockets $S_4$ and $S_5$ will use similar nomenclature for the teeth that are substantially identical to teeth of the sprocket $S_3$.

As explained below, selected teeth of sprocket $S_3$ are trimmed so that the chain 23 can be smoothly up shifted or down shifted to the adjacent sprockets $S_2$ and $S_4$. The consecutive teeth $A_3$–$E_3$ are up shift teeth that work together to control the up shifting of the chain 23 and form a first up shift path. The consecutive teeth $F_3$–$I_3$ are down shift teeth that work together to control the down shifting of the chain 23 and form a first down shift path. While the sprocket $S_3$ is illustrated with only one up shift path and only one down shift path, it will be apparent to those skilled in the bicycle art from this disclosure that the sprocket $S_3$ can be provided with two up shift paths and two down shift paths.

When the chain 23 is shifted from a first sprocket such as sprocket $S_3$ to the next smaller or larger sprocket such as sprocket $S_2$ or $S_4$, the center point of the last roller that engages with the first sprocket is referred to as the escape point, and the center of the first roller that engages with the receiving sprocket is referred to as the engagement point. The chain links between the escape point and the engagement point form the up shift path or the down shift path of the chain during a chain shifting process.

Figure 18:
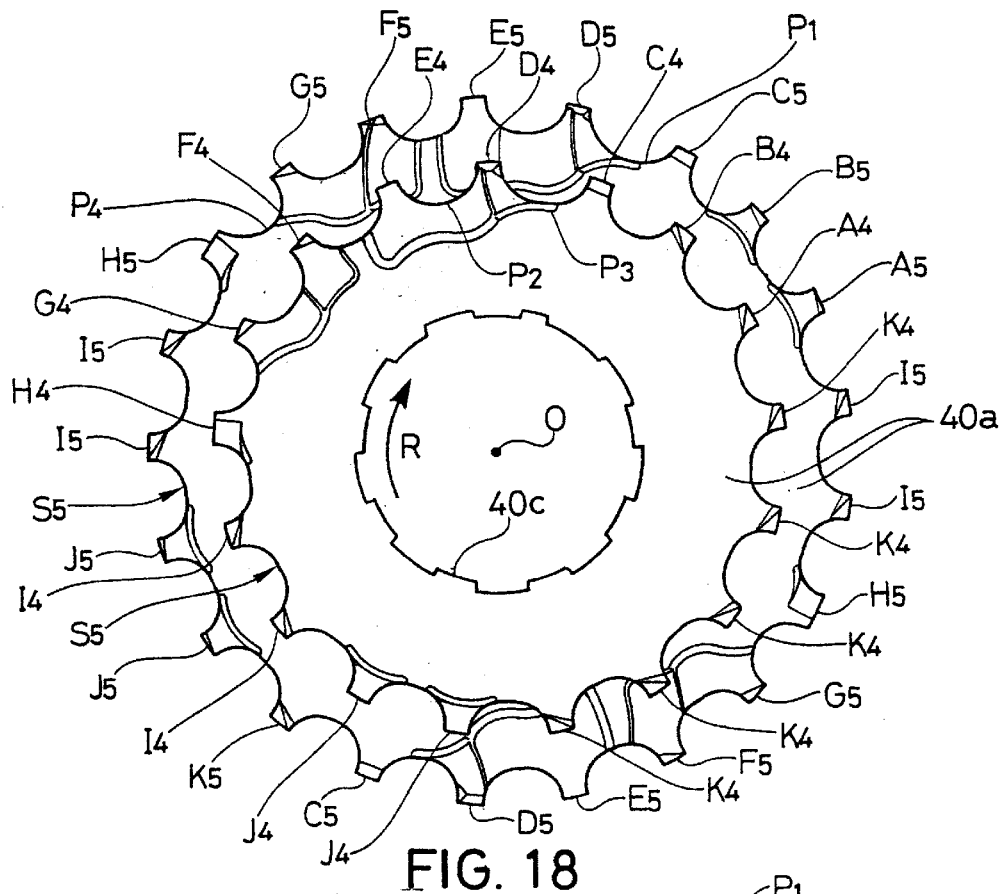
FIG. 18 is a small sprocket side elevational view of the seventeen teeth sprocket and the twenty-one teeth sprocket coupled together.
Figure 19:
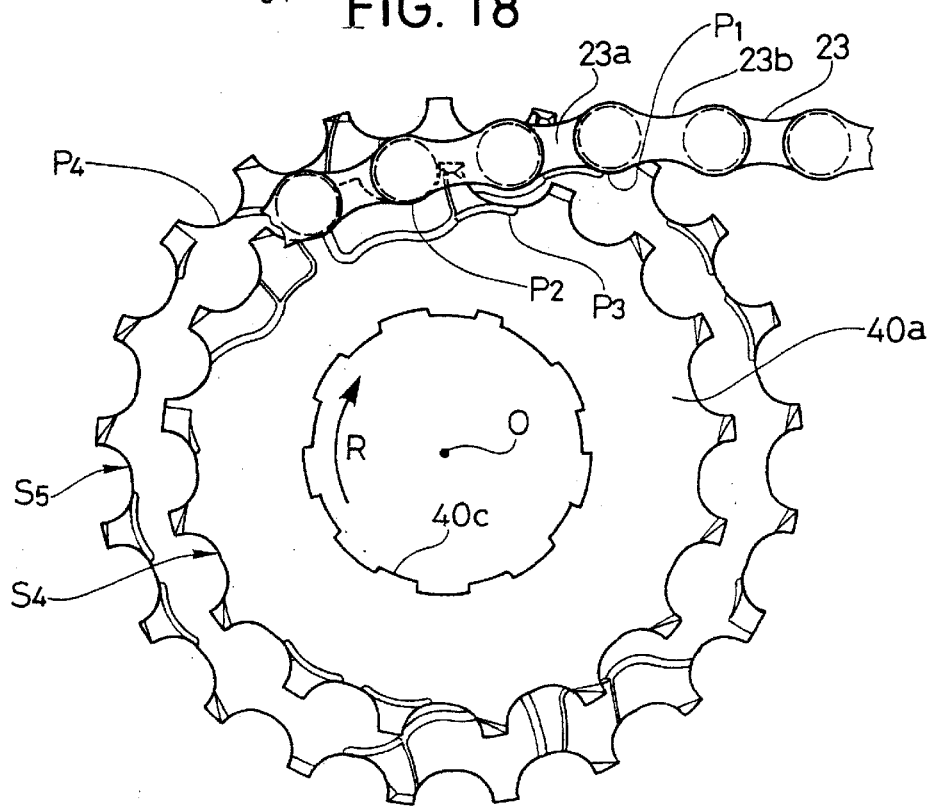
FIG. 19 is a small sprocket side elevational view of the seventeen teeth sprocket and the twenty-one teeth sprocket with a chain being up shifted from the twenty-one teeth sprocket to the seventeen teeth sprocket.
Figure 20:
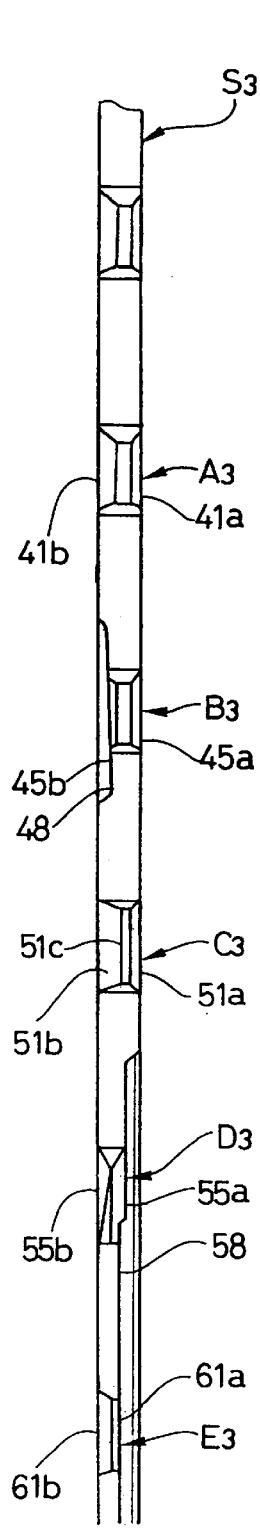
FIG. 20 is a partial edge elevational view of the up shift teeth of the fifteen teeth sprocket illustrated in FIGS. 5 and 6 for the sprocket assembly illustrated in FIG. 3.
Figure 21:
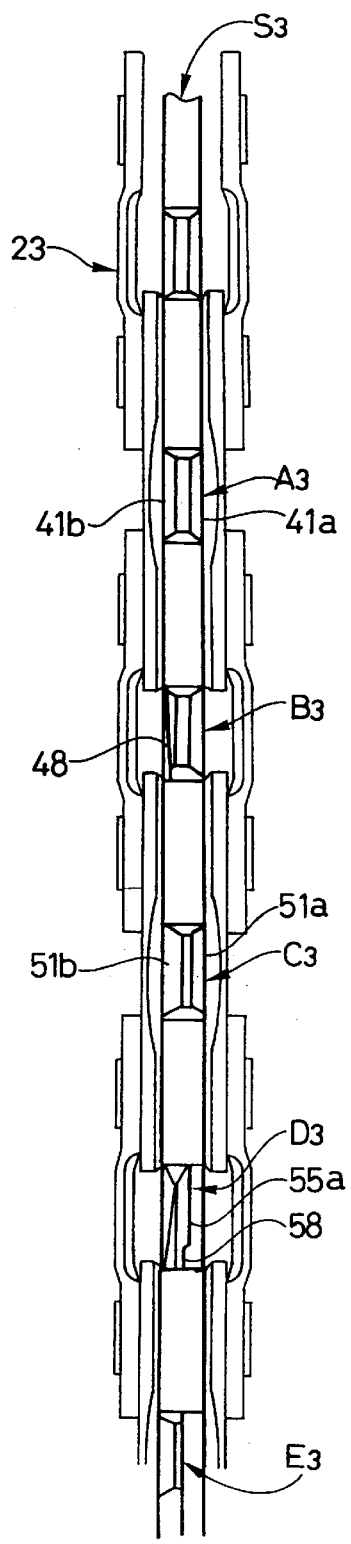
FIG. 21 is a partial edge elevational view of the fifteen teeth sprocket illustrated in FIGS. 5 and 6 for the sprocket assembly illustrated in FIG. 3 with the first and third up shift teeth engaging inner link plates to prevent the chain from up shifting to the thirteen teeth sprocket of the sprocket assembly illustrated in FIG. 3.

Referring to FIGS. 18 and 19, the shifting motion of the chain 23 will now be discussed in more detail. In an up shifting operation, the chain 23 is shifted from the larger sprocket $S_5$ to the smaller sprocket $S_4$. In this up shifting process, the larger sprocket $S_5$ is considered the original sprocket, and thus, the smaller sprocket $S_4$ is considered the receiving sprocket. The larger sprocket $S_5$ has the up shifting escape point $P_1$, while the smaller sprocket $S_4$ has the up shifting engagement point $P_2$ In the down shifting process, the smaller sprocket $S_4$ is considered the original sprocket, and thus, the larger sprocket $S_5$ is considered the receiving sprocket. The smaller sprocket $S_4$ has the down shifting escape point $P_3$, and the larger sprocket $S_5$ has the down shifting engagement point $P_4$.

The angle formed by the escape point and the engagement point to the center of the sprocket assembly 12 is defined as the phase angle between the larger sprocket $S_5$ and the smaller sprocket $S_4$. In the down shifting motion this phase angle is referred to as the down shifting phase angle, while in the up shifting motion this phase angle is referred to as the up shifting phase angle.

The down shift teeth $F_3$–$I_3$ are relatively conventional and configured substantially in accordance with U.S. Pat. No. 4,889,521 to Nagano. Thus, the configurations and functions of the down shift teeth $F_3$–$I_3$ will not be discussed or illustrated in detail herein. Similarly, the configurations and functions of the remaining teeth $J_3$–$K_3$ are also not as important to the present invention. Accordingly, the configurations and functions of the remaining teeth $J_3$–$K_3$ will not be discussed or illustrated in detail herein. Rather, the following description will focus on the configuration and function of the up shift teeth $A_3$–$E_3$.

The up shift teeth $A_3$–$E_3$ are trimmed so that the chain 23 can be smoothly up shifted to the adjacent sprocket $S_2$. More specifically, the tooth $A_3$ is a first up shift tooth. The tooth $B_3$ is a second up shift tooth located adjacent the first up shift tooth $A_3$. The tooth $C_3$ is a third up shift tooth located adjacent the second up shift tooth $B_3$. The tooth $D_3$ is a fourth up shift tooth located adjacent the third up shift tooth $C_3$. The tooth $E_3$ is a fifth up shift tooth located adjacent the fourth up shift tooth $D_3$.

The first, second and third up shift teeth $A_3$–$C_3$ are further dimensioned to prevent an up shifting of the chain 23 when a pair of the outer link plates 23b of the bicycle chain 23 meshes with the second up shift tooth $B_3$. In particular, $A_3$ and $C_3$ are dimensioned to maintain alignment of the bicycle chain 23 with the sprocket body 40 to prevent an up shifting of the chain 23 when a pair of the outer link plates 23b of the bicycle chain 23 meshes with the second up shift tooth $B_3$. However, the first, second and third up shift teeth $A_3$–$C_3$ are further dimensioned to permit the up shifting of the bicycle chain 23 when a pair of inner link plates 23a meshes with the second up shift tooth $B_3$. In other words, the sprocket $S_3$ has an odd number of teeth, and thus, the inner and outer link plates 23a and 23b will alternately engage different teeth with each rotation of the sprocket assembly 12. Therefore, the teeth of the $S_3$, will alternately engage both the inner and outer link plates 23a and 23b and will only permit up shifting if a pair of inner link plates 23a meshes with the second up shift tooth $B_3$.

Referring now to FIGS. 7A–7C, the first up shift tooth $A_3$ preferably has a base portion defined by a pair of flat side surfaces (up shift surfaces) 41a and 41b, and a tip portion defined by a pair of angled surfaces 42a and 42b. The angled or tapered surfaces 42a and 42b extend to a centrally located circumferential tip surface 43. A tooth tip is formed by the two angled surfaces 42a and 42b and the circumferential tip surface 43.

The flat side surfaces 41a and 41b extend radially outwardly from the outer periphery of the sprocket body 40 and are substantially parallel to the sprocket sides 40a and 40b of the sprocket body 40. The two of flat side surfaces 41a and 41b are also preferably substantially level or aligned with the small and large sprocket sides 40a and 40b, respectively. The flat side surfaces 41a and 41b of the first up shift tooth $A_3$ form a chain alignment portion of the first up shift tooth $A_3$. In other words, when a pair of inner link plates 23a are located on the first up shift tooth $A_3$, the flat side surfaces 41a and 41b engage the inner link plates 23a to prevent lateral or axial movement of the chain 23 relative to the sprocket body 40.

The tooth tip of the first up shift tooth $A_3$ is illustrated as a common or regular tooth tip. In other words, the tip surface 43 is centrally located midway between the sprocket sides 40a and 40b, and extends parallel to the sprocket sides 40a and 40b. Alternatively, one or both of the flat side surfaces 41a and 41b can be trimmed to form chamfered surfaces such as shown in FIG. 7 of U.S. Pat. No. 4,889,521 to Nagano. Also, the tip surface 43 can be offset to the small sprocket side 40a of the sprocket body 40 such as in the second embodiment of the present invention.

Referring now to FIGS. 8A–8C, the second up shift tooth $B_3$ is configured to permit chain 23 to shift to the small sprocket side 40a of the sprocket body 40 when a pair of inner link plates 23 a are engaged therewith. The second up shift tooth $B_3$ preferably has a base portion defined by a pair of flat side surfaces 45a and 45b, and a tip portion defined by a pair of angled surfaces 46a and 46b. The angled or tapered surfaces 46a and 46b extend to a circumferential extending tip surface 47. The two angled surfaces 46a and 46b can be trimmed to form chamfered surfaces that allow the chain 23 to easily move on or off of the tooth $B_3$.

A tooth tip is formed by the two angled surfaces 46a and 46b and the circumferential tip surface 47. In this embodiment, the tip surface 47 extends substantially parallel to the sprocket sides 40a and 40b of the sprocket body 40. Moreover, the tip surface 47 is offset to the small sprocket side 40a of the sprocket body 40 as seen in FIG. 8B.

The flat side surfaces 45a and 45b extend radially outwardly from the outer periphery of the sprocket body 40, and are substantially parallel to the sprocket sides 40a and 40b of the sprocket body 40. The flat side surface 45a is also preferably substantially level or aligned with the small sprocket side 40a. The flat side surface 45b, on the other hand, is recessed from the large sprocket side 40b to form an up shift lean recess 48.

Figure 22:
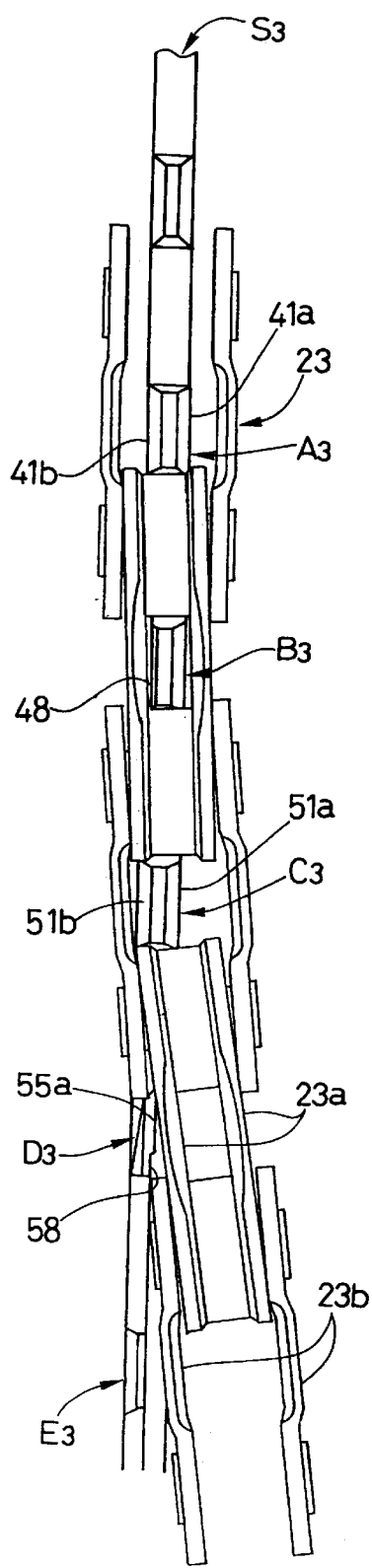
FIG. 22 is a partial edge elevational view of the fifteen teeth sprocket illustrated in FIGS. 5 and 6 for the sprocket assembly illustrated in FIG. 3 with the first and third up shift teeth engaging outer link plates to permit up shifting of the chain to the thirteen teeth sprocket of the sprocket assembly illustrated in FIG. 3.
Figure 23:
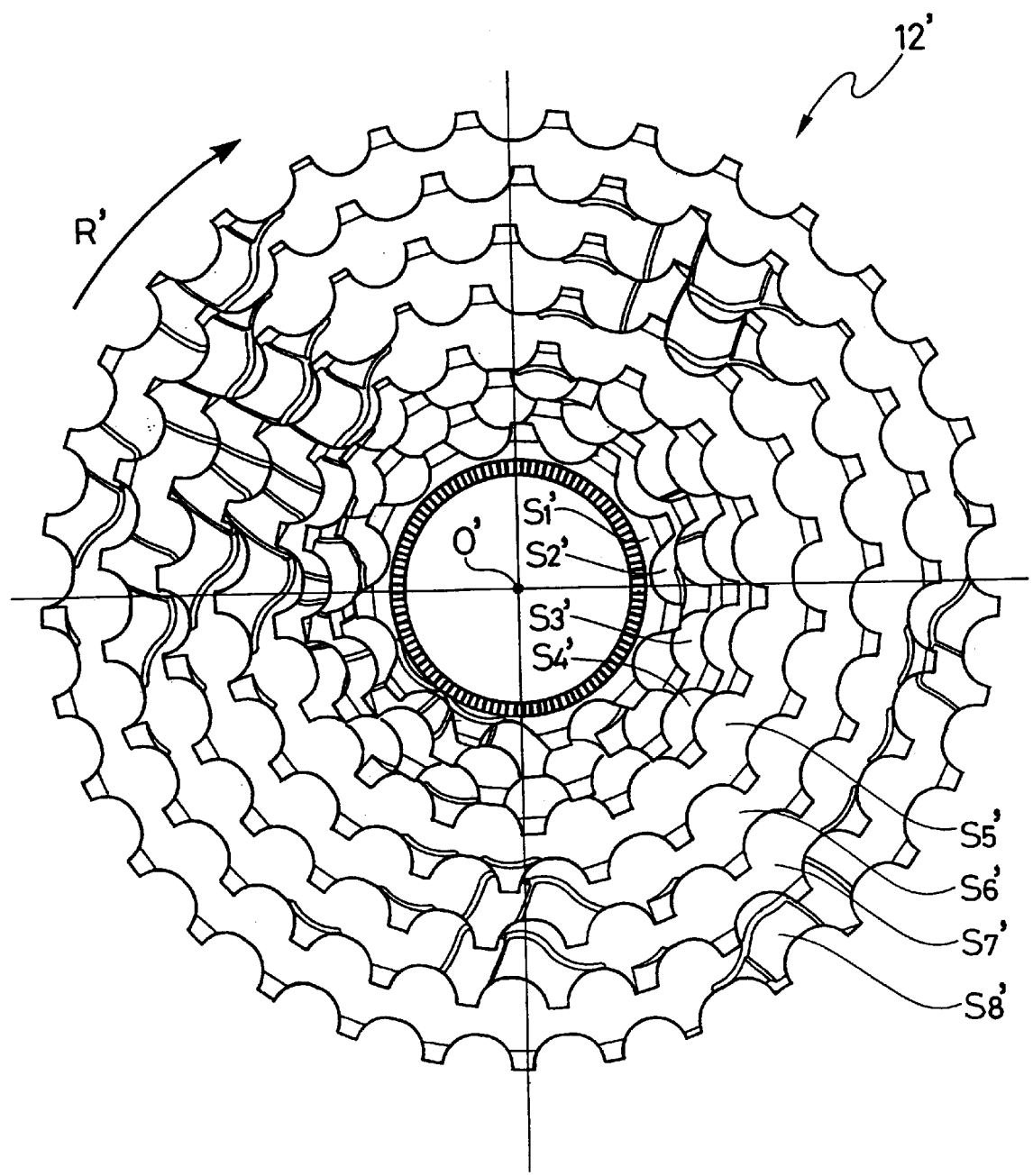
FIG. 23 is a side elevational view of an eight-stage sprocket assembly in accordance with a second embodiment of the present invention.
Figure 24:
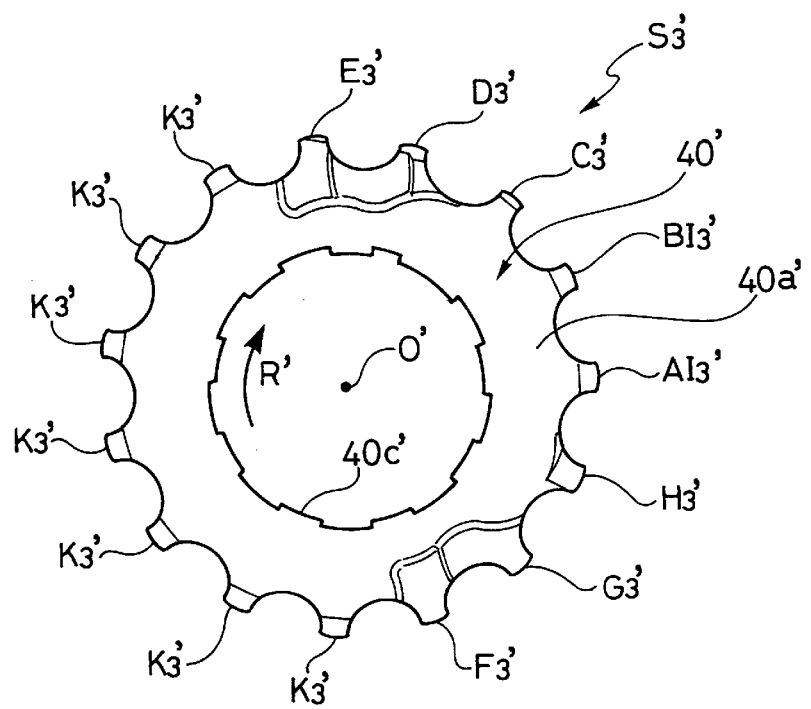
FIG. 24 is a small sprocket side elevational view of the fifteen teeth sprocket of the sprocket assembly illustrated in FIG. 23.
Figure 25:
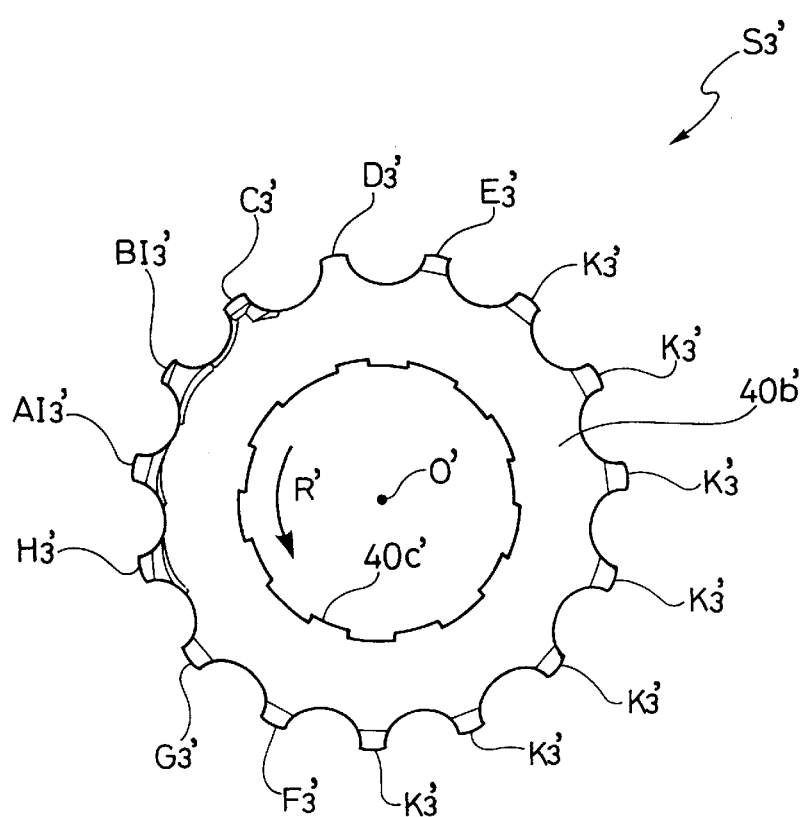
FIG. 25 is a large sprocket side elevational view of the fifteen teeth sprocket of the sprocket assembly illustrated in FIGS. 23 and 24.

The up shift lean recess 48 that is sized to accommodate one of the inner link plates 23a. In other words, the up shift lean recess 48 allows the inner link plate 23a of the chain 23 to shift to the small sprocket side 40a of the sprocket body 40 as seen in FIG. 22. Thus, the up shift lean recess 48 allows the chain 23 to be shift laterally or axially relative to the small sprocket side 40a of the sprocket body 40 to permit an up shift. The up shift lean recess 48 is preferably circumferentially slanted to become deeper as the up shift lean recess 48 approaches the third up shift tooth $C_3$. The outer periphery of the sprocket body 40 defines a root diameter of the second up shift tooth $B_3$, with the up shift lean recess 48 being located mainly radially outward of the root diameter. A portion of the up shift lean recess 48 also lies inside of the root diameter of the second up shift tooth $B_3$ to form an inner link plate escape 49. The inner link plate escape 49 has a curvature that substantially matches the curvature of the portions of the inner link plates 23a the contact this area.

Referring now to FIGS. 9A–9C, preferably, the third up shift tooth $C_3$ has a base portion defined by a pair of flat side surfaces 51a and 51b, and a tip portion defined by a pair of angled surfaces 52a and 52b and a flat radially extending surface 52c. The angled surfaces 52a and 52b and radially extending surface 52c converge to form a circumferentially extending tip surface 53. A tooth tip is formed by these surfaces 52a, 52b, 52c and 53.

The flat side surfaces 51a and 51b extend radially outwardly from the outer periphery of the sprocket body 40 and are substantially parallel to the sprocket sides 40a and 40b of the sprocket body 40. The two of flat side surfaces 51a and 51b are also preferably substantially level or aligned with the small and large sprocket sides 40a and 40b, respectively. The flat side surfaces 51a and 51b of the third up shift tooth $C_3$ form a chain alignment portion of the third up shift tooth $C_3$. In other words, when a pair of inner link plates 23a are located on the third up shift tooth $C_3$, the flat side surfaces 51a and 51b engage the inner link plates 23a to prevent lateral or axial movement of the chain 23 relative to the sprocket body 40. Since the first and third up shift teeth $A_3$ and $C_3$ are only spaced apart by the second up shift tooth $B_3$, the first and third up shift teeth $A_3$ and $C_3$ both either engage the inner link plates 23a of the chain 23 or the outer link plates 23b of the chain 23. When the inner link plates 23a of the chain 23 are engaged with the first and third up shift teeth $A_3$ and $C_3$, the chain 23 can not shift laterally into the up shift lean recess 48 of the second up shift tooth $B_3$.

The angled surfaces 52a and 52b and radially extending surface 52c form a notch top that guides the inner link plates 23a toward the larger sprocket side 40b, the link plates 23a are engaging the third up shift tooth $C_3$. This further ensures that the chain 23 will not be up shifted when the link plates 23a are engaging the third up shift tooth $C_3$.

The tooth tip surface 53 extends substantially parallel to the sprocket sides 40a and 40b of the sprocket body 40. Moreover, the tip surface 53 is offset to the small sprocket side 40a of the sprocket body 40 as seen in FIG. 9B.

Referring now to FIG. 9C, the third up shift tooth $C_3$ has a pitch formed between the third up shift tooth $C_3$ and the fourth up shift tooth $D_3$ that is larger than the pitch formed between the second up shift tooth $B_3$ and the third up shift tooth $C_3$. In other words, the rearward edge of the third up shift tooth $C_3$ is trimmed so that the width $W_1$ of the third up shift tooth $C_3$ is smaller than the other up shift teeth that have a width $W_2$.

Figures 10A, 10B, 10C:
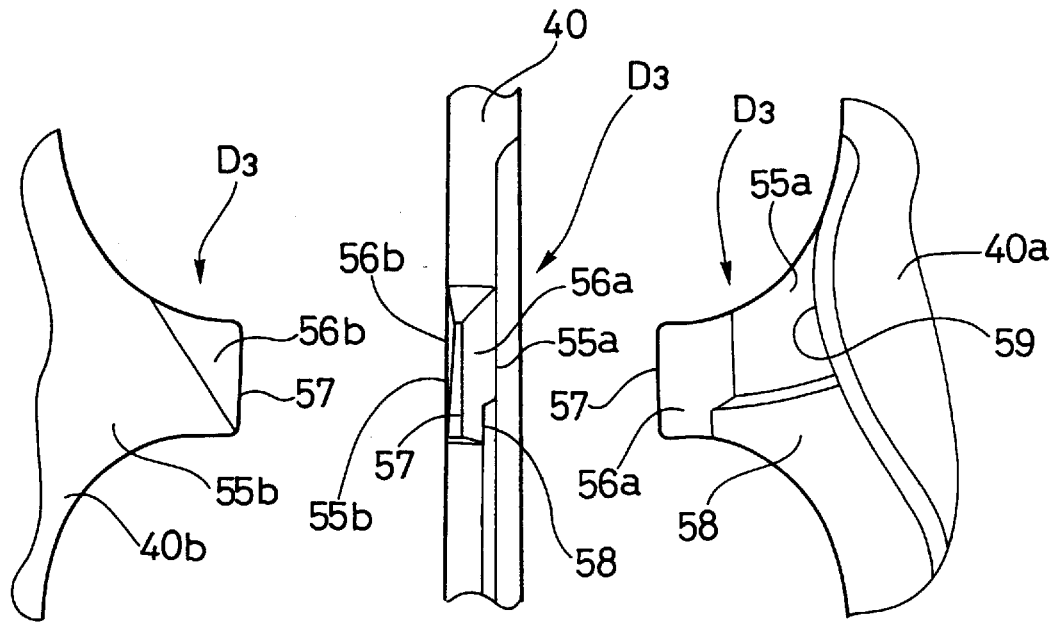
FIG. 10A is a partial, large sprocket side elevational view of the fourth up shift tooth of the fifteen teeth sprocket illustrated in FIGS. 5 and 6.
FIG. 10B is a partial, overhead plan view of the fourth up shift tooth illustrated in FIG. 10A for the fifteen teeth sprocket illustrated in FIGS. 5 and 6.
FIG. 10C is a partial, small sprocket side elevational view of the fourth up shift tooth illustrated in FIGS. 10A and 10B for the fifteen teeth sprocket illustrated in FIGS. 5 and 6.

Referring now to FIGS. 10A–10C, the fourth up shift tooth $D_3$ is configured with an inner link plate escape to permit chain 23 to slide between sprockets $S_3$ and $S_2$ during an up shift. Specifically, the fourth up shift tooth $D_3$ has a base portion defined by a pair of flat side surfaces 55a and 55b that extend radially outwardly from the outer periphery of the sprocket body 40 and are substantially parallel to the sprocket sides 40a and 40b of the sprocket body 40. The small sprocket side 40a of the fourth up shift tooth $D_3$ further has a further recessed surface 58 that extends radially outwardly from the outer periphery of the sprocket body 40 and is substantially parallel to the sprocket sides 40a and 40b of the sprocket body 40.

The flat side surface 55a forms an inner link plate guide surface. The inner link plate guide surface 55a is recessed from the small sprocket side 40a of the sprocket body 40. The large sprocket side 40b of the fourth up shift tooth $D_3$ has a flat side surface 55b that extends radially outwardly from the outer periphery of the sprocket body 40 and is substantially parallel to the sprocket sides 40a and 40b of the sprocket body 40. The flat side surface 55b is also preferably substantially level or aligned with the large sprocket side 40b.

Chamfered surfaces 56a and 56b taper outwardly from the inner link plate guide surface 55a and the flat side surface 55b to a circumferential tip surface 57. The tip surface 57 is thinner than the tip surface 43 of the first up shift tooth $A_3$. The tip surface 57 extends substantially parallel to the sprocket sides 40a and 40b of the sprocket body 40. Moreover, the tip surface 57 is offset to the large sprocket side 40b of the sprocket body 40 as seen in FIG. 10B.

The chamfered surface 56a forms an inner link plate top guide surface that urges the chain towards the small sprocket side 40a when the inner link plates 23a engage the fourth up shift tooth $D_3$.

At the inner edge of the inner link plate guide surface 55a is a curved surface 59 that forms the inner link plate escape to permit chain 23 to slide between sprockets $S_3$ and $S_2$ during an up shift. The curved surface 59 has a curvature that substantially matches the curvature of the portion of the inner link plates 23a that contact this area.

Figures 11A, 11B, 11C:
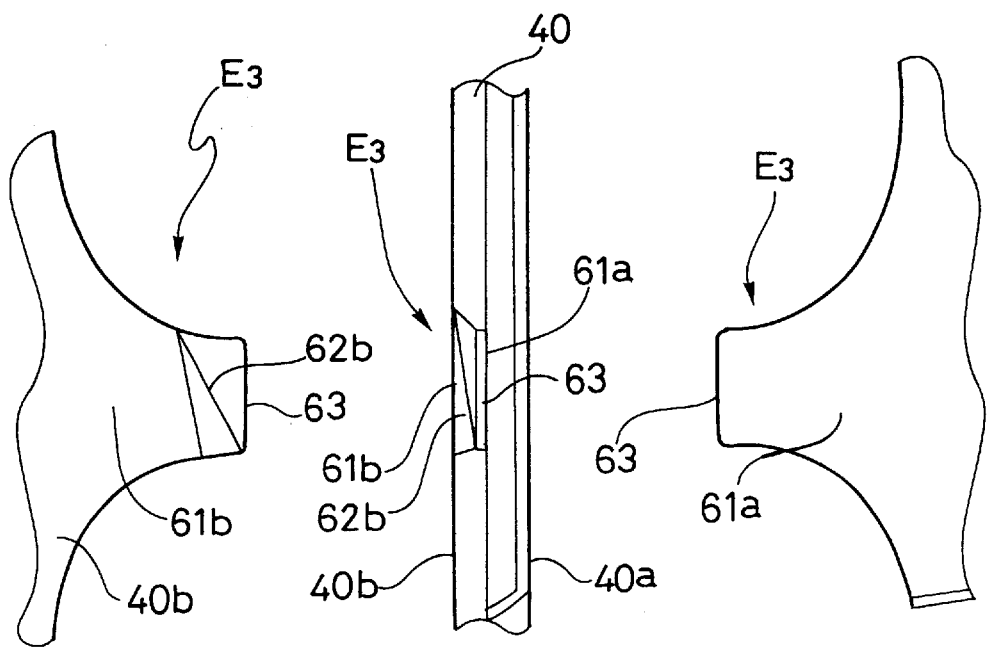
FIG. 11A is a partial, large sprocket side elevational view of the fifth up shift tooth of the fifteen teeth sprocket illustrated in FIGS. 5 and 6.
FIG. 11B is a partial, overhead plan view of the fifth up shift tooth illustrated in FIG. 11A for the fifteen teeth sprocket illustrated in FIGS. 5 and 6.
FIG. 11C is a partial, small sprocket side elevational view of the fifth up shift tooth illustrated in FIGS. 11A and 11B for the fifteen teeth sprocket illustrated in FIGS. 5 and 6.
Figure 12:
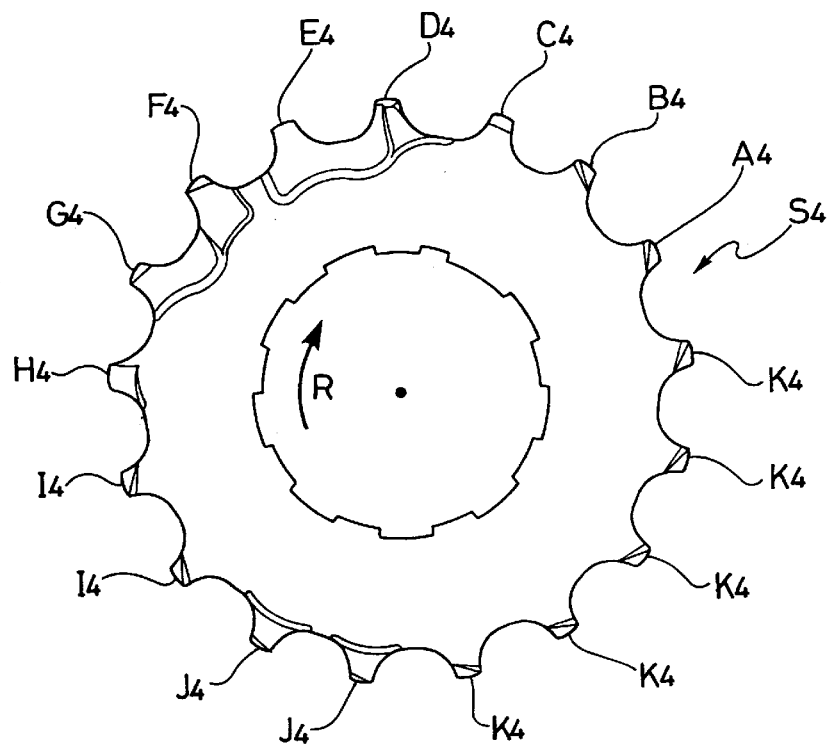
FIG. 12 is a small sprocket side elevational view of the seventeen teeth sprocket for the sprocket assembly illustrated in FIG. 3.
Figure 13:
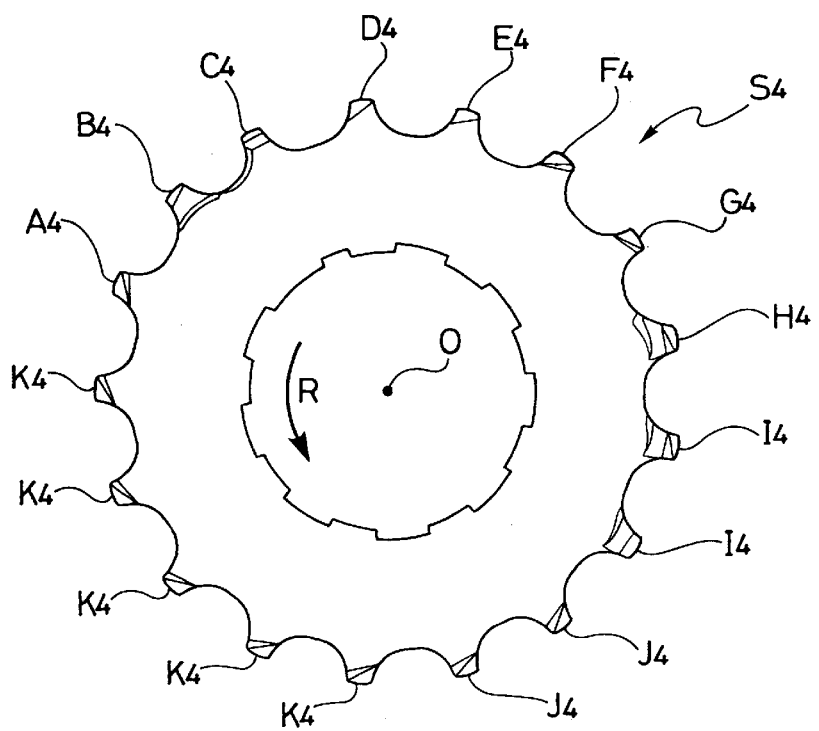
FIG. 13 is a large sprocket side elevational view of the seventeen teeth sprocket illustrated in FIG. 12 for the sprocket assembly illustrated in FIG. 3.
Figure 14:
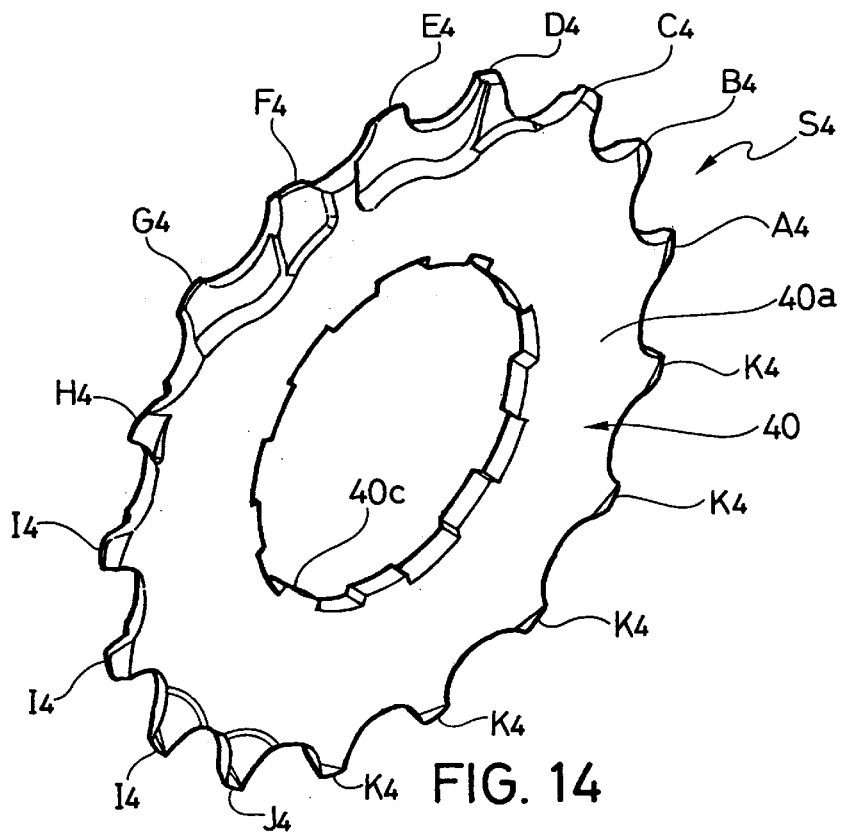
FIG. 14 is a small sprocket side perspective view of the seventeen teeth sprocket illustrated in FIGS. 12 and 13 for the sprocket assembly illustrated in FIG. 3.
Figure 15:
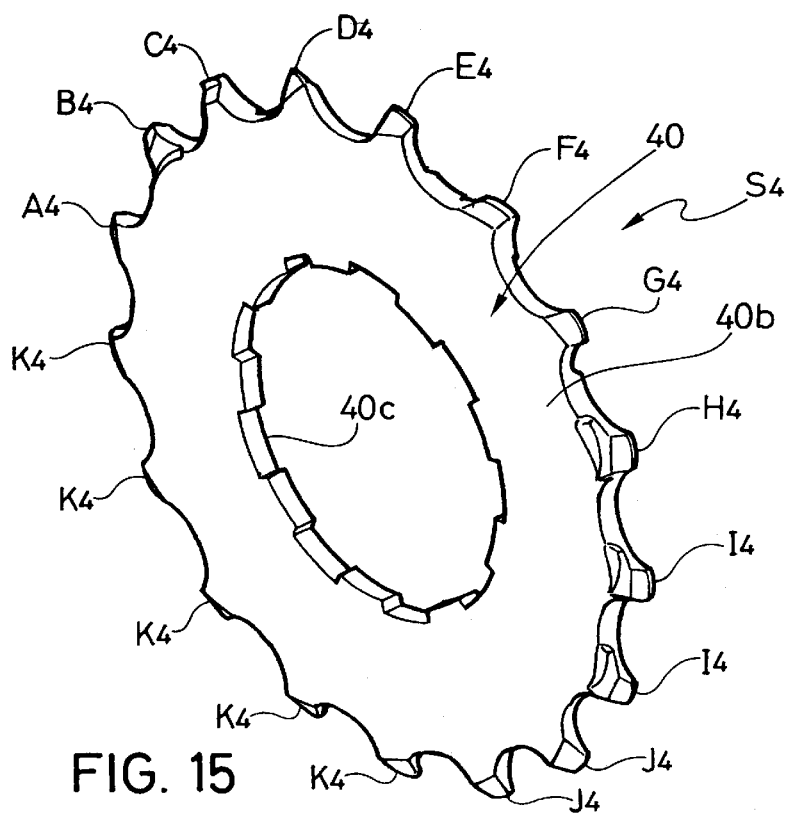
FIG. 15 is a large sprocket side perspective view of the seventeen teeth sprocket illustrated in FIGS. 12–14 for the sprocket assembly illustrated in FIG. 3.

Referring now to FIGS. 11A–11C, the fifth up shift $E_3$ preferably has a base portion defined by a pair of flat side surfaces 61a and 61b and one angled surface 62b extending from the flat side surface 61b to form a circumferentially extending tip surface 63. As seen in FIGS. 11A and 11B, the angled surface 62b can be trimmed to form chamfered surfaces that allow the chain 23 to easily move on or off of the tooth $E_3$. The tip surface 63 is disposed adjacent the large sprocket side 40b of the sprocket $S_3$. Preferably, the tip surface 63 of the tooth $E_3$ extends parallel to the first and second axial sides 40a and 40b of the sprocket body 40 and is offset to the large sprocket side 40b of the sprocket $S_3$.

The flat side surfaces 61a and 61b extend radially outwardly from the outer periphery of the sprocket body 40, and are substantially parallel to the sprocket sides 40a and 40b of the sprocket body 40. The flat side surface 61b is also preferably substantially level or aligned with the large sprocket side 40b. The flat side surface 61a, on the other hand, is recessed from the small sprocket side 40a. Thus, the side surface 61a on the small sprocket side 40a of the tooth $E_3$ lies on the same level as recessed surface 58 of the fourth up shift tooth $D_3$ to form an outer link plate escape or a second up shift recess.

The five consecutive teeth $F_3$–$I_3$ are down shift teeth that work together to control the down shifting of the chain 23 and form a first down shift path. The down shift teeth $F_3$–$I_3$ are disposed immediately behind the up shift teeth $A_3$–$E_3$ relative to the direction of rotation R.

Referring again to FIGS. 5 and 6, the down shift tooth $F_3$ has a first down shift guide recess 71 formed in the small sprocket side 40a of down shift tooth $F_3$. The down shift tooth $G_3$ has a second down shift guide recess 72 formed in the small sprocket side 40a of down shift tooth $G_3$. In this embodiment, second down shift guide recess 72 is deeper than the first down shift guide recess 71 relative to the small sprocket side 40a of the sprocket body 40.

The down shift tooth $H_3$ is considered the first down shift tooth in that it is designed to be the first down shift tooth to catch or fully engage the chain 23. The small sprocket side 40a of down shift tooth $H_3$ has a base portion with a flat surface 80a and a recess 81a The flat surface 80a extends radially outwardly from the outer periphery of the sprocket body 40 and is substantially parallel to the sprocket sides 40a and 40b of the sprocket body 40. The flat side surface 80a is also preferably substantially level or aligned with the small sprocket side 40a. The recess 81a is preferably slanted to be deeper on the edge that is closest to the down shift teeth 13. The down shift tooth $H_3$ preferably has a first down shift lean recess 81b formed on the large sprocket side 40b of the sprocket body 40. The first down shift lean recess 81b is preferably slanted to be deeper on the edge that is closest to the down shift teeth $G_3$.

Each of down shift teeth $I_3$ preferably has a base portion with a flat surface 84a that extends radially outwardly from the outer periphery of the sprocket body 40. The flat surface 84a is angled relative to the sprocket side 40a of the sprocket body 40. The flat side surface 84a is preferably slanted to be deeper on the edge that is closest to the down shift teeth $H_3$.

Each of teeth $J_3$ preferably has a recess 85a on the small sprocket side 40a of the sprocket body 40. These recesses 85a are designed to prevent interference with the inner link plates 23a during down shifting of the chain 23. In other words, the chain 23 is twisted to curve laterally during a down shifting from the smaller sprocket $S_2$ to the larger sprocket $S_3$. This twisting of the chain 23 causes the outer link plates of chain 23 to first mesh with down shift tooth $H_3$ and then mesh with down shift teeth $I_3$. Thus, the chain 23 is further twisted laterally in the direction of the large sprocket side 40b of the sprocket body 40 to be finally aligned with the sprocket body 40. This second curve of the chain 23 is offset to the large sprocket side 40b of the sprocket body 40 so that one of the inner link plates 23a is received in the recesses 85a of the teeth $J_3$.

The teeth $K_3$ are common teeth that drive the chain 23. The teeth $K_3$ do not any specific function during the down shifting or the up shifting in accordance with the present invention. Thus, the teeth $K_3$ will not be discussed or illustrated herein in detail.

Referring now to FIGS. 12–15, the sprocket $S_4$ has seventeen teeth and has similarly shaped teeth to the fifteen teeth sprocket $S_3$, discussed above. The main difference between the seventeen teeth sprocket $S_4$ and the fifteen teeth sprocket $S_3$, discussed above, is that the seventeen teeth sprocket $S_4$ has two extra common teeth $K_4$. In view of the similarity between the seventeen teeth sprocket $S_4$ and the fifteen teeth sprocket $S_3$, the teeth of the seventeen teeth sprocket $S_4$ that have the same function as the teeth of the fifteen teeth sprocket $S_3$ are given the identical reference numerals, but a different subscript number. Thus, the teeth of the seventeen teeth sprocket $S_4$ will not be discussed in detail herein.

The sprocket $S_4$ basically has a sprocket body 40 and a plurality (seventeen) of circumferentially spaced teeth $A_4$–$K_4$ extending radially and outwardly from an outer periphery of the sprocket body 40. The sprocket body 40 of the sprocket $S_4$ has a first axial side or small sprocket side 40a that faces the next smaller sprocket $S_3$ and a second axial side or large sprocket side 40b that faces the next larger sprocket $S_5$. The center of the sprocket $S_4$ is provided with a splined bore 40c that is mounted on the freewheel of the rear hub (not shown) in a conventional manner.

Selected teeth of sprocket $S_4$ are trimmed in substantially the same manner as sprocket $S_3$, explained above, so that the chain 23 can be smoothly up shifted or down shifted to the adjacent sprockets $S_3$ and $S_5$. The consecutive teeth $A_4$–$E_4$ are up shift teeth that work together to control the up shifting of the chain 23 and form a first up shift path. The consecutive teeth $F_4$–$I_4$ are down shift teeth that work together to control the down shifting of the chain 23 and form a first down shift path. While the sprocket $S_4$ is illustrate with only one up shift path and only one down shift path, it will be apparent to those skilled in the bicycle art from this disclosure that the sprocket $S_4$ can be provided with two up shift paths and two down shift path.

Figure 16:
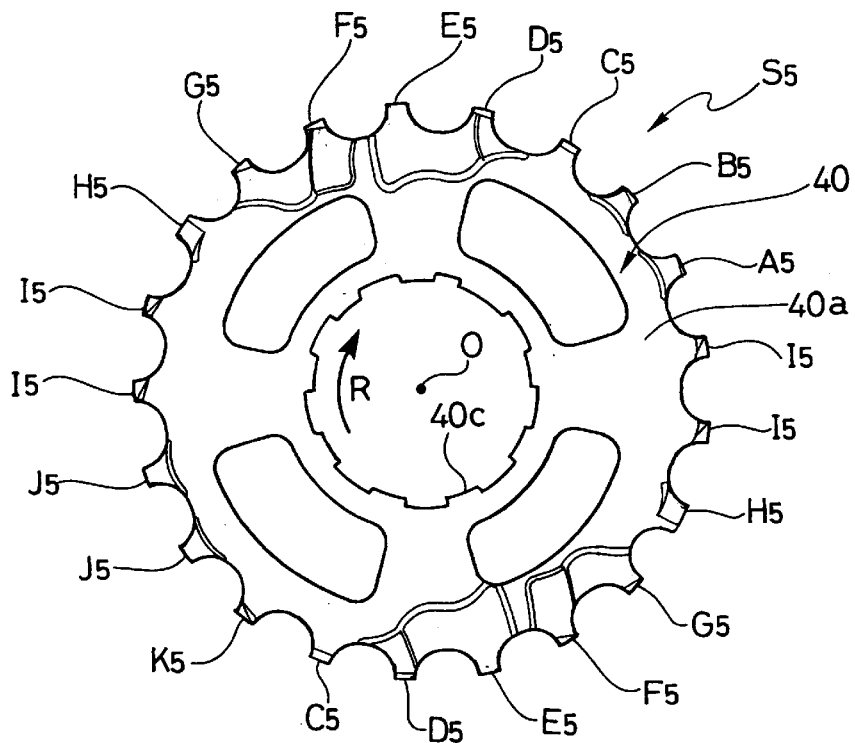
FIG. 16 is a small sprocket side elevational view of the twenty-one teeth sprocket for the sprocket assembly illustrated in FIG. 3.
Figure 17:
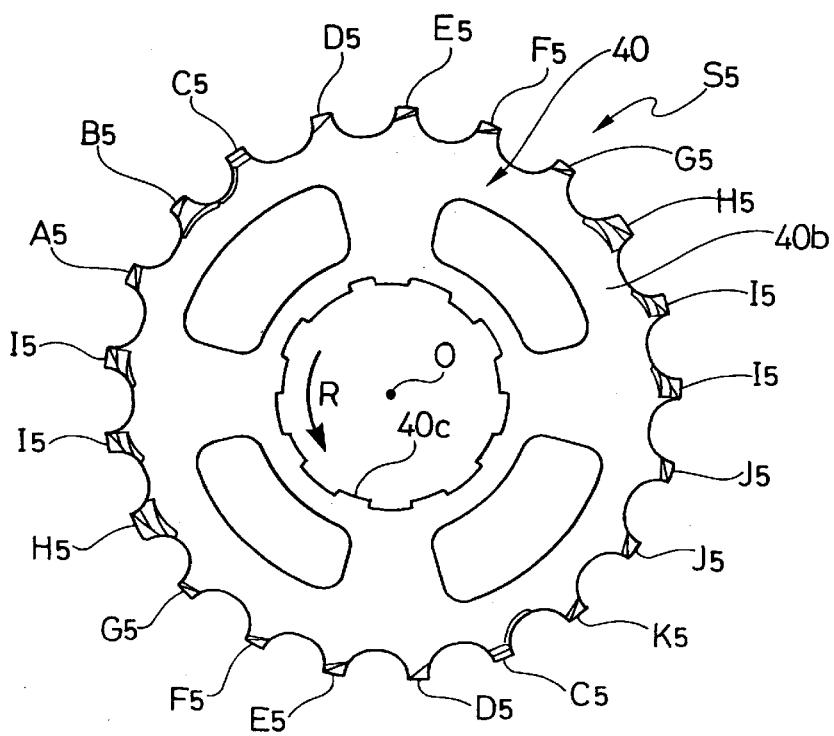
FIG. 17 is a large sprocket side elevational view of the twenty-one teeth sprocket illustrated in FIG. 16 for the sprocket assembly illustrated in FIG. 3.

Referring now to FIGS. 16 and 17, the sprocket $S_5$ has twenty-one teeth and has similarly shaped teeth to the fifteen teeth sprocket $S_3$, discussed above. The main difference between the twenty-one teeth sprocket $S_5$ and the fifteen teeth sprocket $S_3$, discussed above, is that the twenty-one teeth sprocket $S_5$ has one up shift path and two down shift paths.

In view of the similarity between the twenty-one teeth sprocket $S_5$ and the fifteen teeth sprocket $S_3$, the teeth of the twenty-one teeth sprocket $S_5$ that have the same function as the teeth of the fifteen teeth sprocket $S_3$ are given the identical reference numerals, but a different subscript number. Thus, the teeth of the twenty-one teeth sprocket $S_5$ will not be discussed in detail herein.

The sprocket $S_5$ basically has a sprocket body 40 and a plurality (twenty-one) of circumferentially spaced teeth $A_5$–$K_5$ extending radially and outwardly from an outer periphery of the sprocket body 40. The sprocket body 40 of the sprocket $S_5$ has a first axial side or small sprocket side 40a that faces the next smaller sprocket $S_4$ and a second axial side or large sprocket side 40b that faces the next larger sprocket $S_6$.

The center of the sprocket $S_5$ is provided with a splined bore 40c that is mounted on the freewheel of the rear hub (not shown) in a conventional manner.

Selected teeth of sprocket $S_5$ are trimmed in substantially the same manner as sprocket $S_3$, explained above, so that the chain 23 can be smoothly up shifted or down shifted to the adjacent sprockets $S_4$ and $S_6$. The one consecutive set of teeth $A_5$–$E_5$ are up shift teeth that work together to control the up shifting of the chain 23 and form the up shift path. The up shift teeth $B_5$–$E_5$ of the sprocket $S_5$ are substantially identically to the teeth $B_3$–$E_3$ of the sprocket $S_3$, discussed above. The up shift tooth $A_5$ of the sprocket $S_5$ is different from the first up shift tooth $A_3$ of the sprocket $S_3$, discussed above. Rather, the up shift tooth $A_5$ of the sprocket $S_5$ has a recess on its small sprocket side 40a. In other words, the up shift tooth $A_5$ of the sprocket $S_5$ is similar to the teeth $J_3$ of the sprocket $S_3$, discussed above. The two consecutive sets of teeth $F_5$–$I_5$ are down shift teeth that work together to control the down shifting of the chain 23 and form the two down shift paths. The teeth $F_5$–$I_5$ of the sprocket $S_5$ are substantially identically to the teeth $F_3$–$I_3$ of the sprocket $S_3$, discussed above.

SECOND EMBODIMENT

Referring now to FIGS. 23–39, a sprocket assembly 12' will now be discussed in accordance with a second embodiment of the present invention. In this second embodiment, the sprocket assembly 12' is an eight stage sprocket assembly with sprockets $S_1'$–$S_8'$ being spaced from each other at a predetermined interval.

In this second embodiment, the multistage sprocket assembly 12' of the invention has a teeth configuration of 11T-13T-15T-17T-21T-25T-29T-33T for the sprockets $S_1'$–$S_8'$, respectively. Of course, it will be apparent to those skilled in the bicycle art from this disclosure that the sprockets $S_1'$–$S_8'$ can have other teeth configurations. The present invention is optimized for a sprocket having a total number of teeth equaling an odd number. Of course, it will be apparent to those skilled in the bicycle art that the sprockets of the present invention can be configured with a total number of teeth equaling an even number, as discussed below.

The sprocket assembly 12' of the second embodiment uses many of the features of the sprocket assembly 12 of the first embodiment. Thus, only the differences of the sprocket assembly 12' from sprocket assembly 12 of the first embodiment will be discussed and/or illustrated herein. In view of the similarity between this embodiment and the sprockets of the first embodiment, the teeth of this embodiment that have substantially the same function as the teeth of the prior embodiment are given the identical referential numerals as the first embodiment but with a single prime ('). Thus, explanations of these similar teeth and their operations will be omitted from this embodiment.

The sprocket $S_3'$ mainly differs from that of sprockets $S_3$ in that the up shifting path and the down shifting path overlap. Thus, in this embodiment, the down shift teeth are disposed forward of the up shift teeth relative to the direction of rotation. In other words, the first up shift tooth $A_3$ and the second down shift tooth $I_3$ are formed as a first integrated (up/down shift) tooth $AI_3'$, and the second up shift tooth $B_3$ and the third down shift tooth $I_3$ are formed as a second integrated (up/down shift) tooth $BI_3'$. However, the second integrated tooth $BI_3'$ is basically identical to the second up shift tooth $B_3$. Also, up shift tooth $C_3'$–$E_3'$ have been modified in the sprocket $S_3'$. Therefore, only teeth $AI_3'$, $C_3'$, and $D_3'$ will be discussed in detail below.

Figures 26A, 26B, 26C:
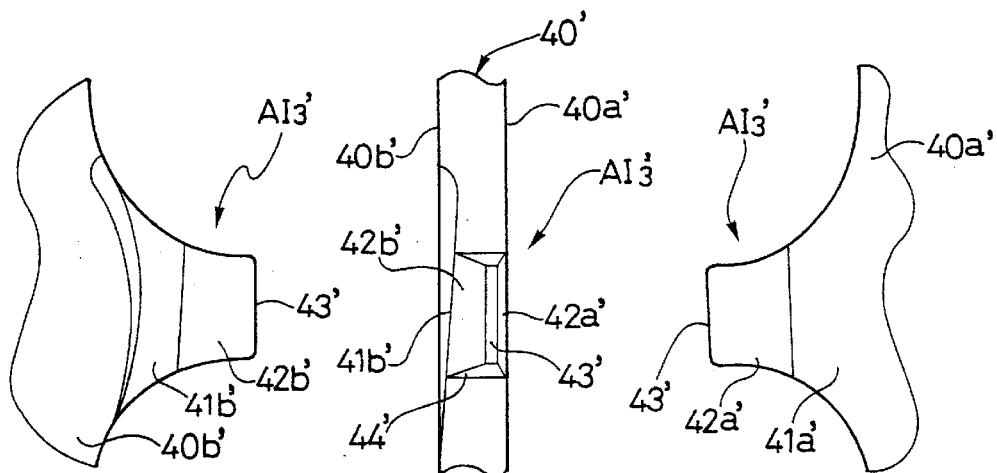
FIG. 26A is a partial, large sprocket side elevational view of the integrated first up shift/second down shift tooth of the fifteen teeth sprocket illustrated in FIGS. 24 and 25.
FIG. 26B is a partial, overhead plan view of the integrated first up shift/second down shift tooth illustrated in FIG. 26A for the fifteen teeth sprocket illustrated in FIGS. 24 and 25.
FIG. 26C is a partial, small sprocket side elevational view of the integrated first up shift/second down shift tooth illustrated in FIGS. 26A and 26B for the fifteen teeth sprocket illustrated in FIGS. 24 and 25.

Referring now to FIGS. 26A–26C, the first integrated tooth $AI_3'$ preferably has a base portion defined by a pair of flat side surfaces (up shift surfaces) 41a' and 41b', and a tip portion defined by a pair of angled surfaces 42a' and 42b'. The angled or tapered surfaces 42a' and 42b' form a circumferential extending tip surface 43'. A tooth tip is formed by the two angled surfaces 42a' and 42b' and the circumferential tip surface 43'. The tooth tip of the first integrated tooth $AI_3'$ extends parallel to the sprocket sides 40a' and 40b'. Also, the tip surface 43' is offset to the small sprocket side 40a' of the sprocket body 40'.

The flat side surfaces 41a' and 41b' extend radially outwardly from the outer periphery of the sprocket body 40'. The flat side surface 41a' is substantially parallel to the sprocket sides 40a' and 40b' of the sprocket body 40', while the flat side surface 41b' is angled or slanted relative to the sprocket sides 40a' and 40b' of the sprocket body 40'. The flat side surface 41a' is also preferably substantially level or aligned with the small sprocket side 40a', while the flat side surface 41b' has a trailing edge 44' that is substantially aligned with the large side 40b' of the sprocket body 40'. This trailing edge 44' extends substantially radially from the large sprocket side 40b' of the sprocket body 40'. In other words, the flat side surface 41b' is angled or slanted relative to the large sprocket side 40b' of the sprocket body 40' to form a recess. The recess formed by the flat side surface 41b' is flush with the large sprocket side 40b' at the trailing edge 44' that is adjacent to the second integrated tooth $BI_3'$ and deeper at the leading edge that is adjacent to the down shift tooth $H_3'$.

The flat side surface 41a' and the edge 44' of the first integrated tooth $AI_3'$ form a chain alignment portion of the first integrated tooth $AI_3'$. In other words, when a pair of inner link plates 23a are located on the first integrated tooth $AI_3'$, the flat side surface 41a' and the edge 44' engage the inner link plates 23a to prevent lateral or axial movement of the chain 23 relative to the sprocket body 40'.

Figures 27A, 27B, 27C:
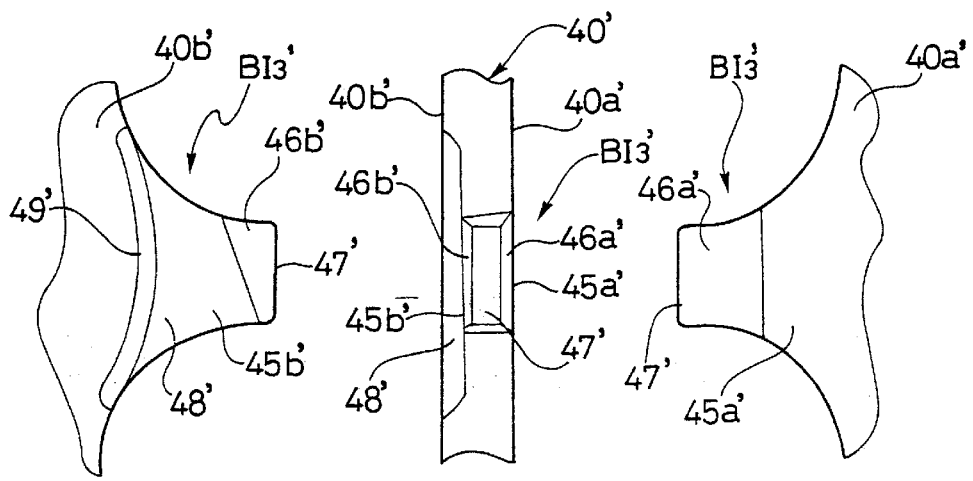
FIG. 27A is a partial, large sprocket side elevational view of the integrated second up shift/third down shift tooth of the fifteen teeth sprocket illustrated in FIGS. 24 and 25.
FIG. 27B is a partial, overhead plan view of the integrated second up shift/third down shift tooth illustrated in FIG. 27A for the fifteen teeth sprocket illustrated in FIGS. 24 and 25.
FIG. 27C is a partial, small sprocket side elevational view of the integrated second up shift/third down shift tooth illustrated in FIGS. 27A and 27B for the 15 fifteen teeth sprocket illustrated in FIGS. 24 and 25.

Referring now to FIGS. 27A–27C, the second integrated tooth $BI_3'$ is configured to permit chain 23 to shift to the small sprocket side 40a' of the sprocket body 40' when a pair of inner link plates 23a are engaged therewith. The second integrated tooth $BI_3'$ preferably has a base portion defined by a pair of flat side surfaces 45a' and 45b', and a tip portion defined by a pair of angled surfaces 46a' and 46b'. The angled or tapered surfaces 46a' and 46b' extend to a circumferential extending tip surface 47'. The two angled surfaces 46a' and 46b' can be trimmed to form chamfered surfaces that allow the chain 23 to easily move on or off of the second integrated tooth $BI_3'$.

A tooth tip is formed by the two angled surfaces 46a' and 46b' and the circumferential tip surface 47'. In this embodiment, the tip surface 47' extends substantially parallel to the sprocket sides 40a' and 40b' of the sprocket body 40'. Moreover, the tip surface 47' is offset to the small sprocket side 40a of the sprocket body 40' as seen in FIG. 27B.

The flat side surfaces 45a' and 45b' extend radially outwardly from the outer periphery of the sprocket body 40', and are substantially parallel to the sprocket sides 40a and 40b of the sprocket body 40'. The flat side surface 45a' is also preferably substantially level or aligned with the small sprocket side 40a'. The flat side surface 45b', on the other hand, is recessed from the large sprocket side 40b' to form an up shift lean recess 48'.

Figure 39:
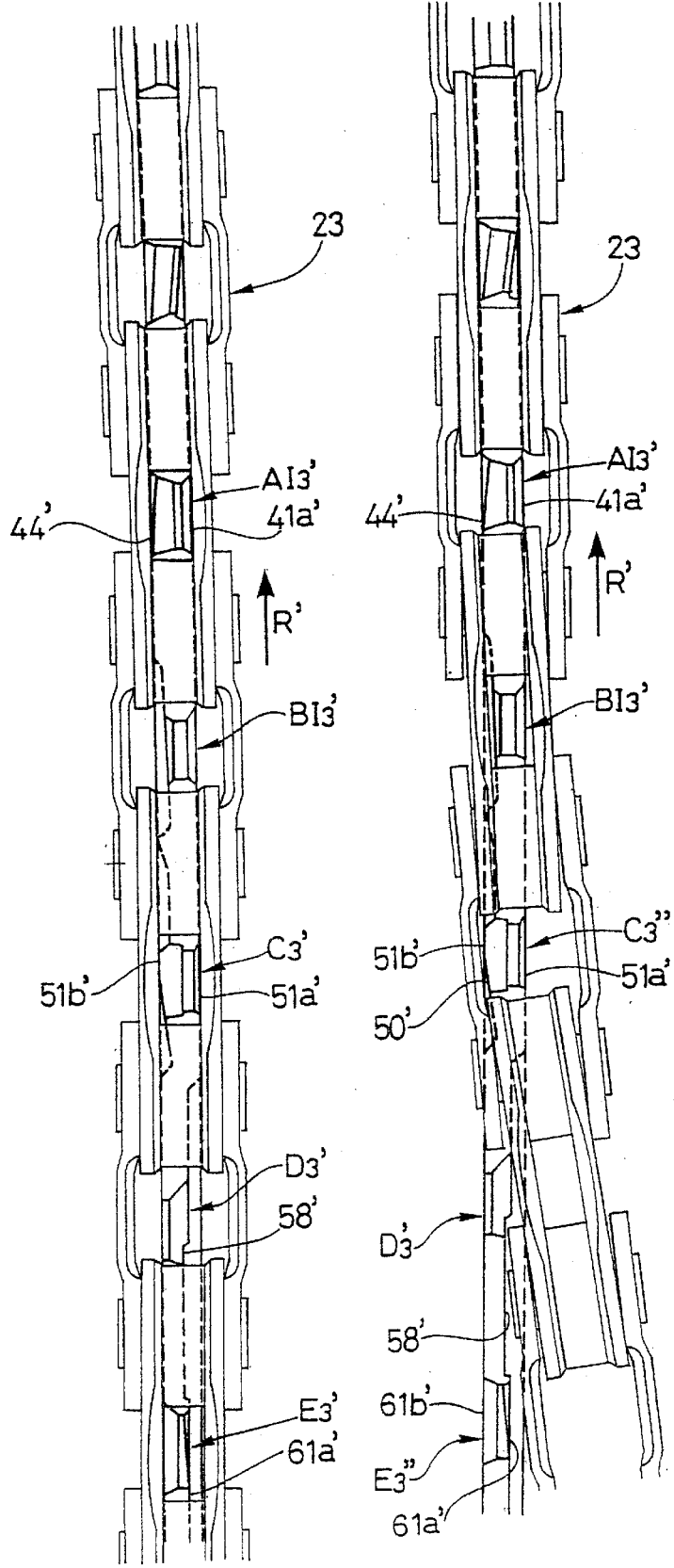
FIG. 39 is a partial edge elevational view of the fifteen teeth sprocket illustrated in FIGS. 24 and 25 for the sprocket assembly illustrated in FIG. 23 with the first and third up shift teeth engaging outer link plates to permit up shifting of the chain to the thirteen teeth sprocket of the sprocket assembly illustrated in FIG. 23.

The up shift lean recess 48' that is sized to accommodate one of the inner link plates 23a. In other words, the up shift lean recess 48' allows the inner link plate 23a of the chain 23 to shift to the small sprocket side 40a' of the sprocket body 40' as seen in FIG. 39. Thus, the up shift lean recess 48' allows the chain 23 to be shift laterally or axially relative to the small sprocket side 40a' of the sprocket body 40' to permit an up shift The up shift lean recess 48' is preferably circumferentially slanted to become deeper as the up shift lean recess 48' approaches the third up shift tooth $C_3'$. The outer periphery of the sprocket body 40' defines a root diameter of the second integrated tooth $BI_3'$, with the up shift lean recess 48' being located mainly radially outward of the root diameter. A portion of the up shift lean recess 48' also lies inside of the root diameter of the second integrated tooth $BI_3'$ to form an inner link plate escape 49'. The inner link plate escape 49' has a curvature that substantially matches the curvature of the portions of the inner link plates 23a that contact this area.

Figures 28A, 28B, 28C:
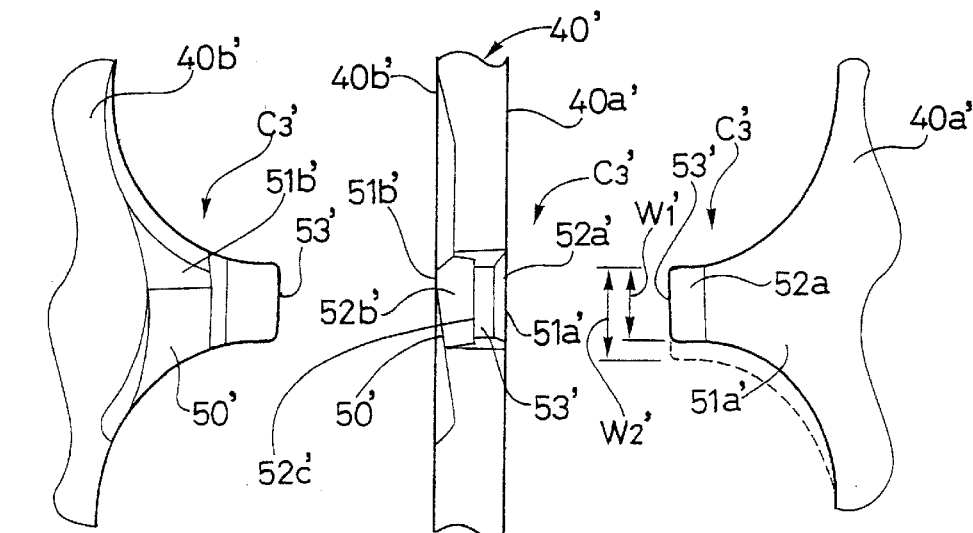
FIG. 28A is a partial, large sprocket side elevational view of the third up shift tooth of the fifteen teeth sprocket illustrated in FIGS. 24 and 25.
FIG. 28B is a partial, overhead plan view of the third up shift tooth illustrated in FIG. 28A for the fifteen teeth sprocket illustrated in FIGS. 24 and 25.
FIG. 28C is a partial, small sprocket side elevational view of the third up shift tooth illustrated in FIGS. 28A and 28B for the fifteen teeth sprocket illustrated in FIGS. 24 and 25.

Referring now to FIGS. 28A–28C, preferably, the third up shift tooth $C_3'$ has a base portion defined by an angled surface 50' and a pair of flat side surfaces 51a' and 51b'. The third up shift tooth $C_3'$ has a tip portion defined by a pair of angled surfaces 52a' and 52b' and a flat radially extending surface 52c'. The angled surfaces 52a' and 52b' and radially extending surface 52c' converge to form a circumferentially extending tip surface 53'. A tooth tip is formed by these surfaces 52a', 52b', 52c' and 53'.

The flat side surfaces 51a' and 51b' extend radially outwardly from the outer periphery of the sprocket body 40' and are substantially parallel to the sprocket sides 40a' and 40b' of the sprocket body 40'. The two flat side surfaces 51a' and 51b' are also preferably substantially level or aligned with the small and large sprocket sides 40a' and 40b', respectively. The flat side surfaces 51a' and 51b' of the third up shift tooth $C_3'$ form a chain alignment portion of the third tooth $C_3'$. In other words, when a pair of inner link plates 23a are located on the third tooth $C_3'$, the flat side surfaces 51a' and 51b' engage the inner link plates 23a to prevent lateral or axial movement of the chain 23 relative to the sprocket body 40'. Since the first and third up shift teeth $AI_3'$ and $C_3'$ are only spaced apart by the second integrated tooth $BI_3'$, the first and third up shift teeth $AI_3'$ and $C_3'$ both either engage the inner link plates 23a of the chain 23 or the outer link plates 23b of the chain 23. When the inner link plates 23a of the chain 23 are engaged with the first and third up shift teeth $AI_3'$ and $C_3'$, the chain 23 can not shift laterally into the up shift lean recess 48' of the second integrated tooth $BI_3'$.

The angled surfaces 52a' and 52b' and radially extending surface 52c' form a notch top that guides the inner link plates 23a toward the larger sprocket side 40b', the link plates 23a are engaging the third up shift tooth $C_3'$. This further ensures that the chain 23 will not be up shifted when the link plates 23a are engaging the third up shift tooth $C_3'$.

The tooth tip surface 53' extends substantially parallel to the sprocket sides 40a' and 40b' of the sprocket body 40'. Moreover, the tip surface 53' is offset to the small sprocket side 40a' of the sprocket body 40' as seen in FIG. 28B.

Referring now to FIG. 28C, the third up shift tooth $C_3'$ has a pitch formed between the third up shift tooth $C_3'$ and the fourth up shift tooth $D_3'$ that is larger than the pitch formed between the second integrated tooth $BI_3'$ and the third up shift tooth $C_3'$. In other words, the rearward edge of the third up shift tooth $C_3'$ is trimmed so that the width $W_1'$ of the third up shift tooth $C_3'$ is smaller than the other up shift teeth that have a width $W_2'$.

Figures 29A, 29B, 29C:
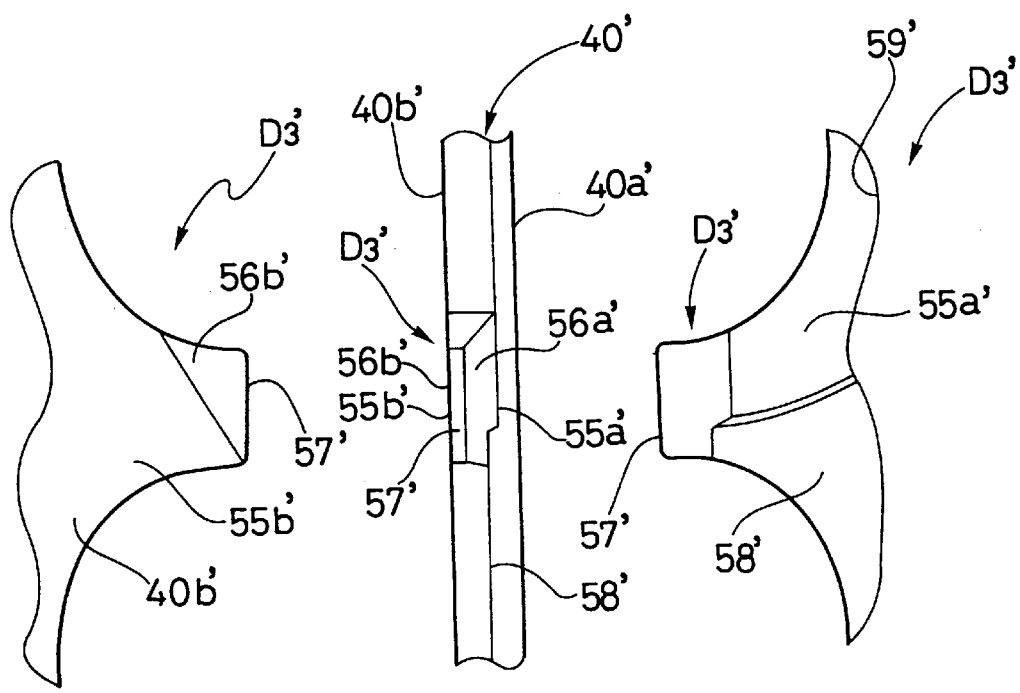
FIG. 29A is a partial, large sprocket side elevational view of the fourth up shift tooth of the fifteen teeth sprocket illustrated in FIGS. 24 and 25.
FIG. 29B is a partial, overhead plan view of the fourth up shift tooth illustrated in FIG. 29A for the fifteen teeth sprocket illustrated in FIGS. 24 and 25.
FIG. 29C is a partial, small sprocket side elevational view of the fourth up shift tooth illustrated in FIGS. 29A and 29B for the fifteen teeth sprocket illustrated in FIGS. 24 and 25.

Referring now to FIGS. 29A–29C, the fourth up shift tooth $D_3'$ is configured with an inner link plate escape to permit chain 23 to slide between sprockets $S_3'$ and $S_2'$ during an up shift. Specifically, the fourth up shift tooth $D_3'$ has a base portion defined by a pair of flat side surfaces 55a' and 55b' that extend radially outwardly from the outer periphery of the sprocket body 40' and are substantially parallel to the sprocket sides 40a' and 40b' of the sprocket body 40'. The small sprocket side 40a' of the fourth up shift tooth $D_3$' further has a further recessed surface 58' that extends radially outwardly from the outer periphery of the sprocket body 40' and is substantially parallel to the sprocket sides 40a' and 40b' of the sprocket body 40'. The recess 58' extend to the fifth up shift tooth $E_3$' to form an outer link plate escape or a second up shift recess.

The flat side surface 55a' forms an inner link plate guide surface. The inner link plate guide surface 55a' is recessed from the small sprocket side 40a' of the sprocket body 40'. The large sprocket side 40b' of the fourth up shift tooth $D_3$' has a flat side surface 55b' that extends radially outwardly from the outer periphery of the sprocket body 40' and is substantially parallel to the sprocket sides 40a' and 40b' of the sprocket body 40'. The flat side surface 55b' is also preferably substantially level or aligned with the large sprocket side 40b'.

Chamfered surfaces 56a' and 56b' taper outwardly from the inner link plate guide surface 55a' and the flat side surface 55b' to a circumferential tip surface 57'. The tip surface 57' is thinner than the tip surface 43' of the first integrated tooth $AI_3$'. The tip surface 57' extends substantially parallel to the sprocket sides 40a' and 40b' of the sprocket body 40'. Moreover, the tip surface 57' is offset to the large sprocket side 40b' of the sprocket body 40' as seen in FIG. 29B.

The chamfered surface 56a' forms an inner link plate top guide surface that urges the chain towards the small sprocket side 40a' when the inner link plates 23a engage the fourth up shift tooth $D_3$'.

At the inner edge of the inner link plate guide surface 55a is a curved surface 59' that forms the inner link plate escape to permit chain 23 to slide between sprockets $S_3$ and $S_2$ during an up shift. The curved surface 59' has a curvature that substantially matches the curvature of the portion of the inner link plates 23a that contact this area.

Figures 30A, 30B, 30C:
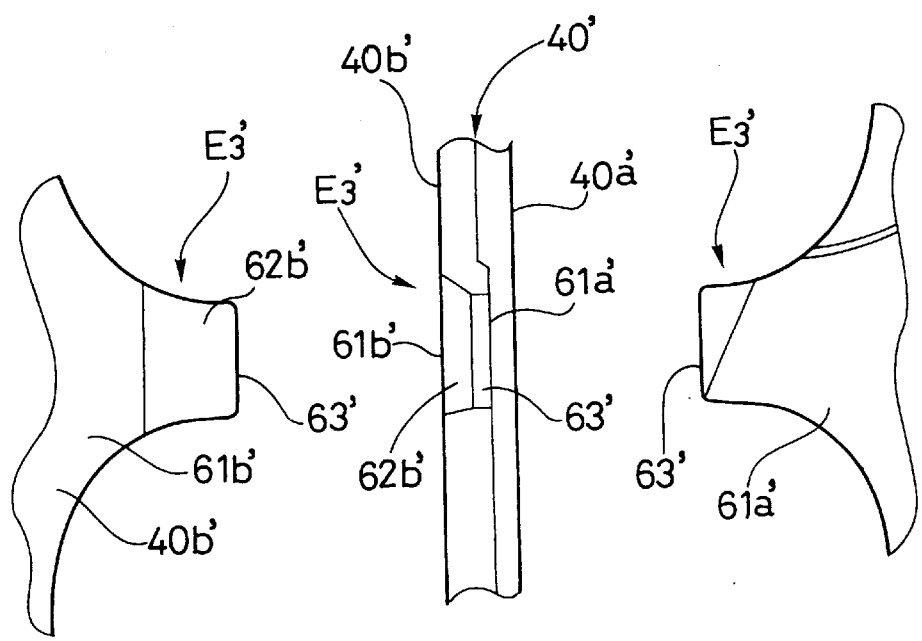
FIG. 30A is a partial, large sprocket side elevational view of the fifth up shift tooth of the fifteen teeth sprocket illustrated in FIGS. 24 and 25.
FIG. 30B is a partial, overhead plan view of the fifth up shift tooth illustrated in FIG. 30A for the fifteen teeth sprocket illustrated in FIGS. 24 and 25.
FIG. 30C is a partial, small sprocket side elevational view of the fifth up shift tooth illustrated in FIGS. 30A and 30B for the fifteen teeth sprocket illustrated in FIGS. 24 and 25.

Referring now to FIGS. 30A–30C, the fifth up shift $E_3$' preferably has a base portion defined by a pair of flat side surfaces 61a' and 61b' and one angled surface 62b' extending from the flat side surface 61b' to form a circumferentially extending tip surface 63'. As seen in FIGS. 30A and 30B, the angled surface 62b' can be trimmed to form chamfered surfaces that allow the chain 23 to easily move on or off of the tooth $E_3$'. The tip surface 63' is disposed adjacent the large sprocket side 40b' of the sprocket $S_3$'. Preferably, the tip surface 63' of the tooth $E_3$ extends parallel to the first and second axial sides 40a' and 40b' of the sprocket body 40' and is offset to the large sprocket side 40b' of the sprocket $S_3$'.

The flat side surfaces 61a' and 61b' extend radially outwardly from the outer periphery of the sprocket body 40', and are substantially parallel to the sprocket sides 40a' and 40b' of the sprocket body 40'. The flat side surface 61b' is also preferably substantially level or aligned with the large sprocket side 40b'. The flat side surface 61a', on the other hand, is recessed from the large sprocket side 40b'. Thus, the side surface 61a' on the small sprocket side 40a' of the tooth $E_3$' lies on the same level as recessed surface 55a' of the fourth up shift tooth $D_3$'.

Figure 31:
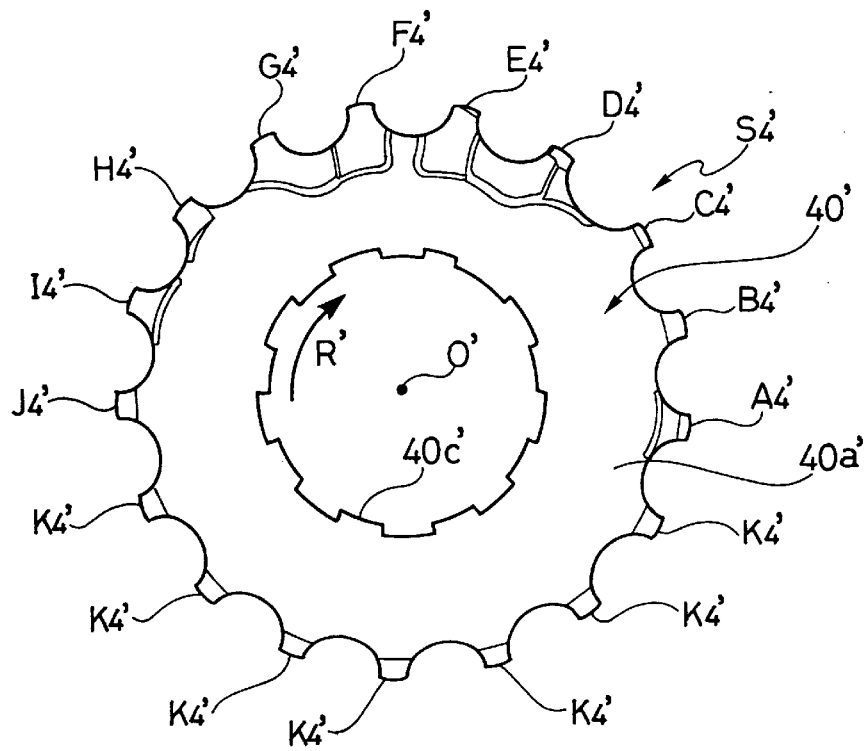
FIG. 31 is a small sprocket side elevational view of the seventeen teeth sprocket for the sprocket assembly illustrated in FIG. 23.
Figure 32:
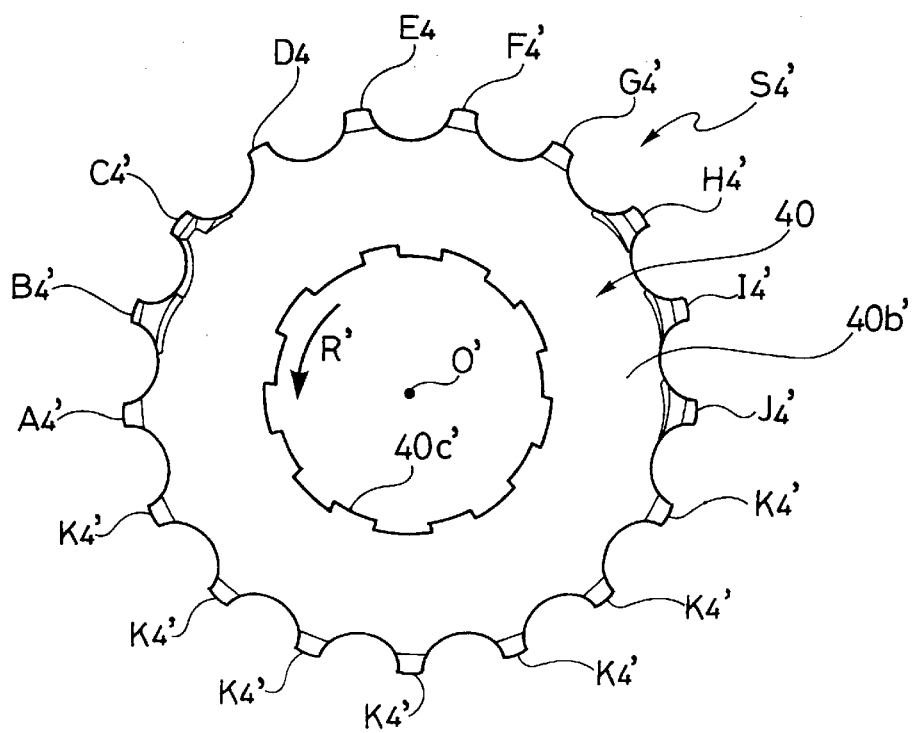
FIG. 32 is a large sprocket side elevational view of the seventeen teeth sprocket illustrated in FIG. 31 for the sprocket assembly illustrated in FIG. 23.

Referring now to FIGS. 31 and 32, the sprocket $S_4$' has seventeen teeth and has similarly shaped teeth to the seventeen teeth sprocket $S_4$, discussed above. The main difference between the seventeen teeth sprocket $S_4$' and the seventeen teeth sprocket $S_4$, discussed above, is that the seventeen teeth sprocket $S_4$ has two extra down shift teeth $J_4$. In view of the similarity between the seventeen teeth sprocket $S_4$' and the seventeen teeth sprocket $S_4$, the teeth of the seventeen teeth sprocket $S_4$' that have the same function as the teeth of the seventeen teeth sprocket $S_4$ are given the identical reference numerals, but a different subscript number. Thus, the teeth of the seventeen teeth sprocket $S_4$' will not be discussed in detail herein.

The sprocket $S_4$' basically has a sprocket body 40' and a plurality (seventeen) of circumferentially spaced teeth $A_4$'–$K_4$' extending radially and outwardly from an outer periphery of the sprocket body 40'. The sprocket body 40' of the sprocket $S_4$' has a first axial side or small sprocket side 40a' that faces the next smaller sprocket $S_3$' and a second axial side or large sprocket side 40b' that faces the next larger sprocket $S_5$'. The center of the sprocket $S_4$' is provided with a splined bore 40c' that is mounted on the freewheel of the rear hub (not shown) in a conventional manner.

Selected teeth of sprocket $S_4$' are trimmed in substantially the same manner as sprocket $S_4$, explained above, so that the chain 23 can be smoothly up shifted or down shifted to the adjacent sprockets $S_3$' and $S_5$'. The consecutive teeth $A_4$'–$E_4$' are up shift teeth that work together to control the up shifting of the chain 23 and form a first up shift path. The consecutive teeth $F_4$'–$I_4$' are down shift teeth that work together to control the down shifting of the chain 23 and form a first down shift path. While the sprocket $S_4$' is illustrate with only one up shift path and only one down shift path, it will be apparent to those skilled in the bicycle art from this disclosure that the sprocket $S_4$' can be provided with two up shift paths and two down shift path.

Figure 33:
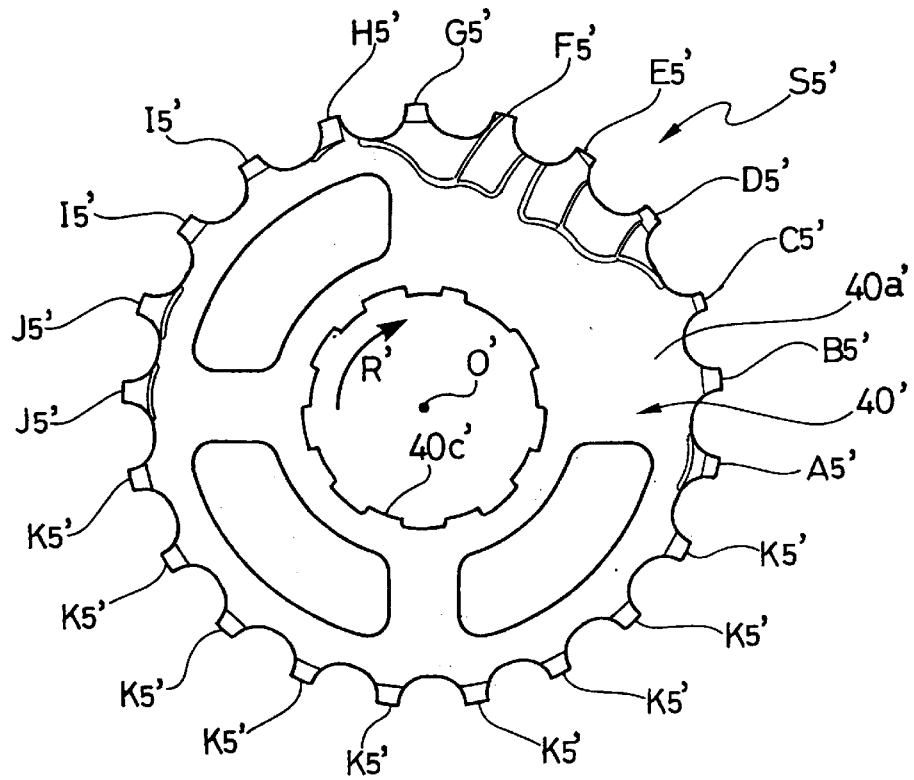
FIG. 33 is a small sprocket side elevational view of the twenty-one teeth sprocket for the sprocket assembly illustrated in FIG. 23.
Figure 34:
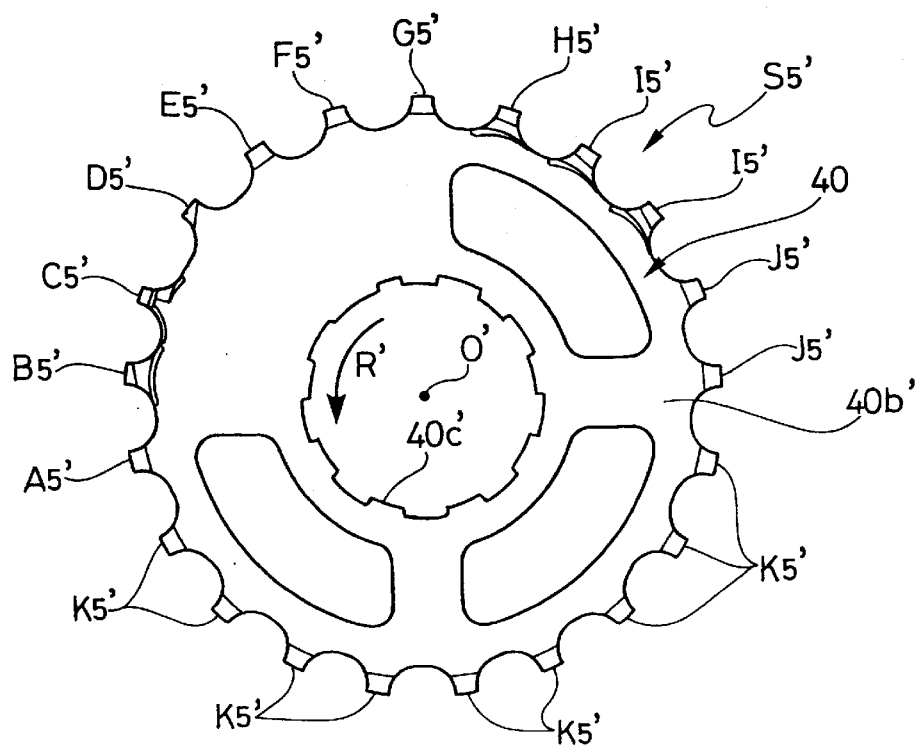
FIG. 34 is a large sprocket side elevational view of the twenty-one teeth sprocket illustrated in FIG. 33 for the sprocket assembly illustrated in FIG. 23.

Referring now to FIGS. 33 and 34, the sprocket $S_5$' has twenty-one teeth and has similarly shaped teeth to the fifteen teeth sprocket $S_3$', discussed above. The main difference between the twenty-one teeth sprocket $S_5$' and the fifteen teeth sprocket $S_3$', discussed above, is that it has more teeth and the tooth $E_5$' is configured as in the sprocket $S_3$', i.e., the flat side surface 61a' is at the same level as the flat side surface 55a'.

In view of the similarity between the twenty-one teeth sprocket $S_5$' and the fifteen teeth sprockets $S_3$ and $S_3$', the teeth of the twenty-one teeth sprocket $S_5$' that have the same function as the teeth of the fifteen teeth sprocket $S_3$' are given the identical reference numerals, but a different subscript number. Thus, the teeth of the twenty-one teeth sprocket $S_5$' will not be discussed in detail herein.

The sprocket $S_5$' basically has a sprocket body 40 and a plurality (twenty-one) of circumferentially spaced teeth $A_5$'–$K_5$' extending radially and outwardly from an outer periphery of the sprocket body 40'. The sprocket body 40' of the sprocket $S_5$' has a first axial side or small sprocket side 40a' that faces the next smaller sprocket $S_4$' and a second axial side or large sprocket side 40b' that faces the next larger sprocket $S_6$'. The center of the sprocket $S_5$' is provided with a splined bore 40c' that is mounted on the freewheel of the rear hub (not shown) in a conventional manner.

Selected teeth of sprocket $S_5$' are trimmed in substantially the same manner as sprockets $S_3$ and/or $S_3$', explained above, so that the chain 23 can be smoothly up shifted or down shifted to the adjacent sprockets $S_4$' and $S_6$'.

Figure 35:
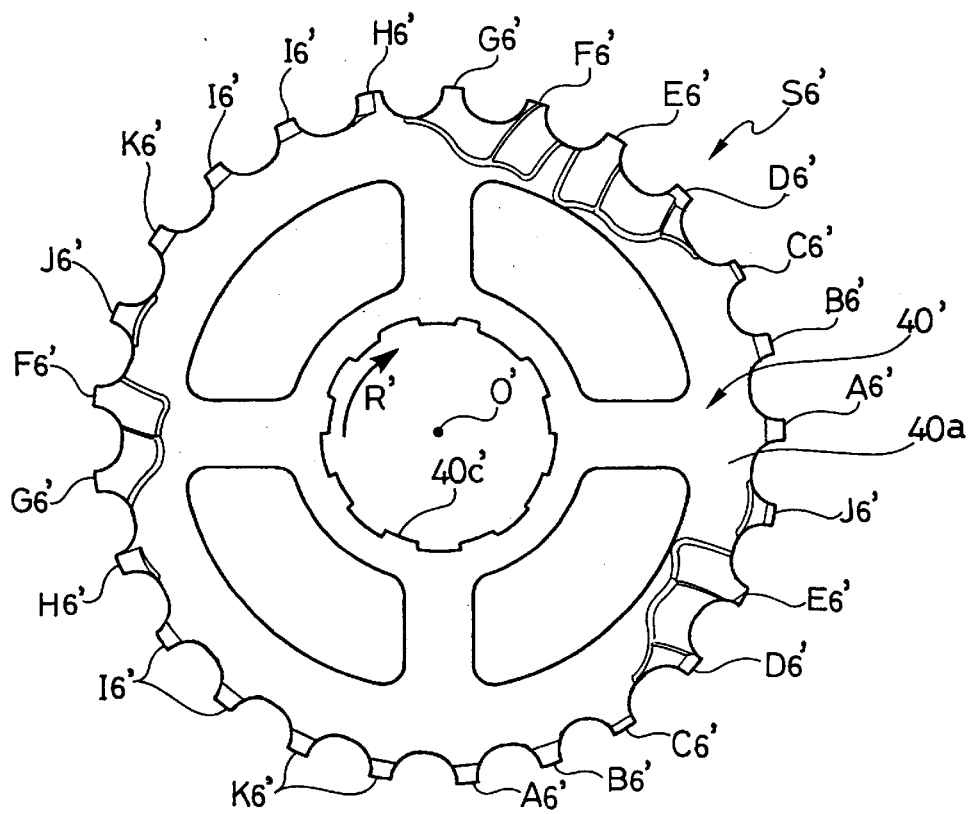
FIG. 35 is a small sprocket side elevational view of the twenty-five teeth sprocket for the sprocket assembly illustrated in FIG. 23.
Figure 36:
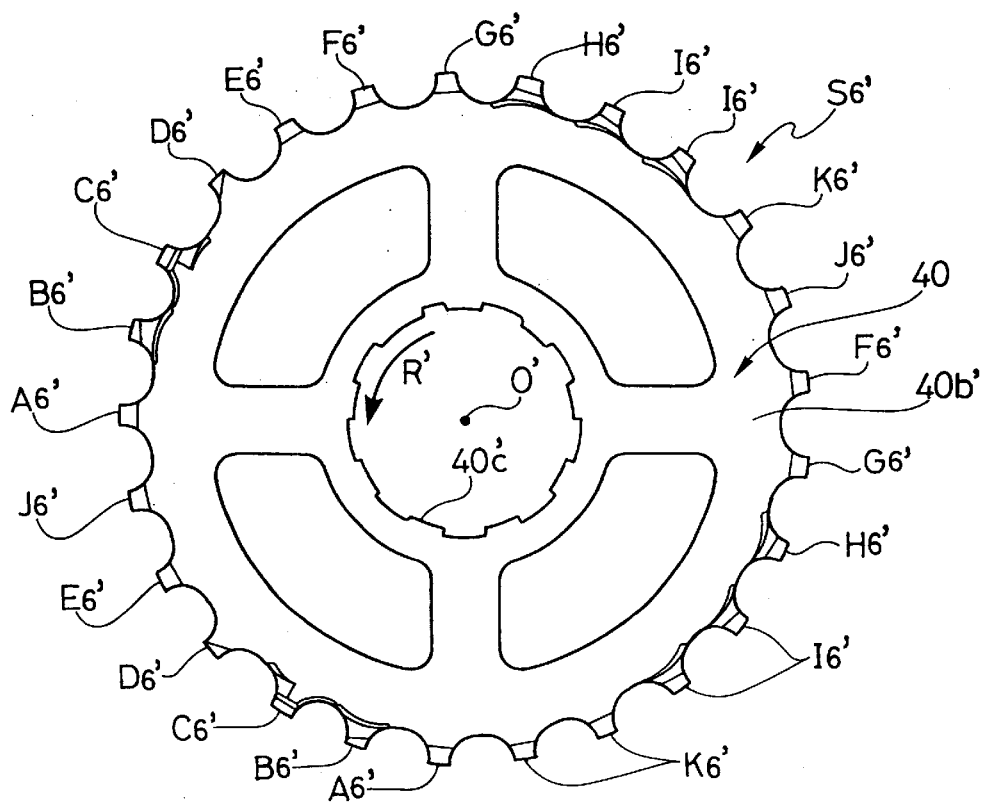
FIG. 36 is a large sprocket side elevational view of the twenty-five teeth sprocket illustrated in FIG. 35 for the sprocket assembly illustrated in FIG. 23.
Figure 37:
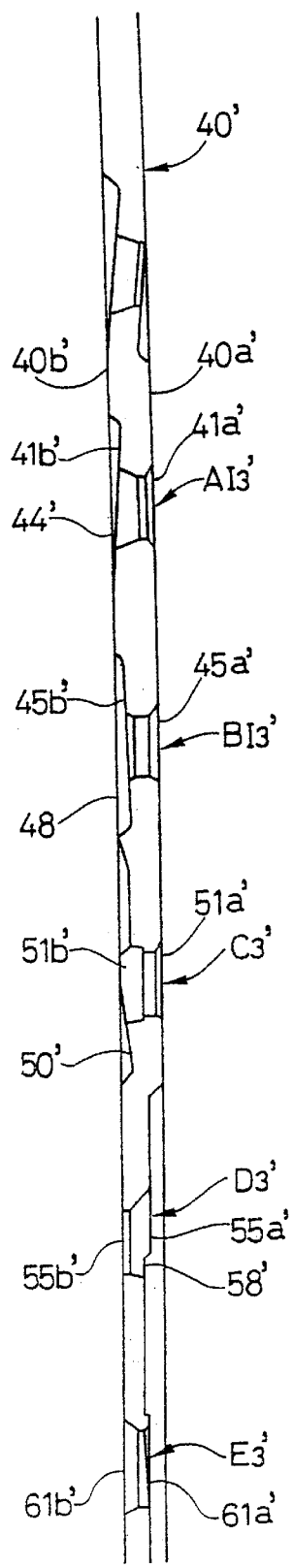
FIG. 37 is a partial edge elevational view of the up shift teeth of the fifteen teeth sprocket illustrated in FIGS. 24 and 25 for the sprocket assembly illustrated in FIG. 23.
Figure 38:
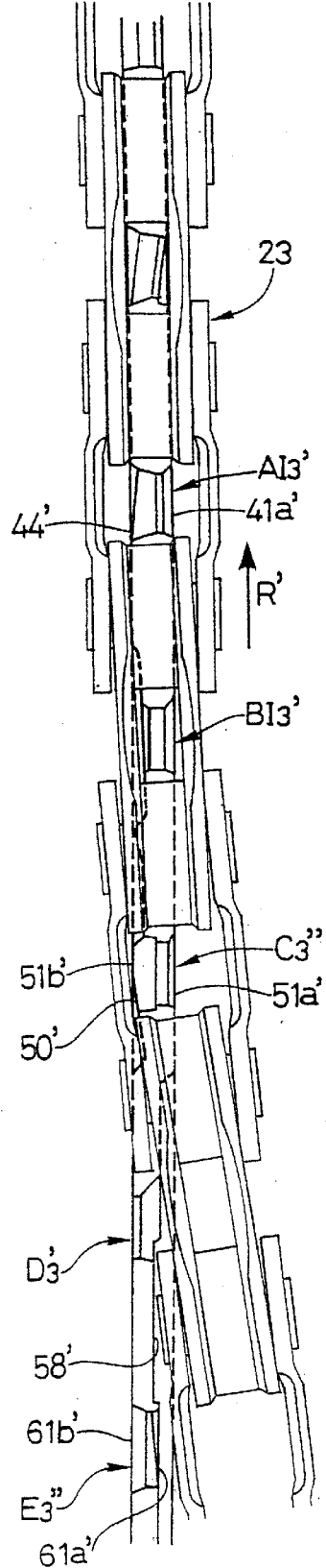
FIG. 38 is a partial edge elevational view of the fifteen teeth sprocket illustrated in FIGS. 24 and 25 for the sprocket assembly illustrated in FIG. 23 with the first and third up shift teeth engaging inner link plates to prevent the chain from up shifting to the thirteen teeth sprocket of the sprocket assembly illustrated in FIG. 23.

Referring now to FIGS. 35 and 36, the sprocket $S_6$' has twenty-five teeth and has similarly shaped teeth to the twenty-one teeth sprocket $S_6$', discussed above. The main difference between the twenty-five teeth sprocket $S_5$' and the twenty-one teeth sprocket $S_5$', discussed above, is that the twenty-five teeth sprocket $S_6'$ has two up shift paths and two down shift paths.

In view of the similarity between the twenty-five teeth sprocket $S_6$ and the sprocket $S_5'$, the teeth of the twenty-five teeth sprocket $S_5'$ that have the same function as the teeth of the sprocket $S_5'$ are given the identical reference numerals, but a different subscript number. Thus, the teeth of the twenty-five teeth sprocket $S_6'$ will not be discussed in detail herein.

The sprocket $S_6'$ basically has a sprocket body 40' and a plurality (twenty-five teeth) of circumferentially spaced teeth $A_6'$–$K_6'$ extending radially and outwardly from an outer periphery of the sprocket body 40'. The sprocket body 40' of the sprocket $S_6'$ has a first axial side or small sprocket side 40a' that faces the next smaller sprocket $S_4'$ and a second axial side or large sprocket side 40b' that faces the next larger sprocket $S_6'$. The center of the sprocket $S_6'$ is provided with a splined bore 40c' that is mounted on the freewheel of the rear hub (not shown) in a conventional manner.

SPROCKET WITH EVEN TEETH CONFIGURATION

Figure 40:
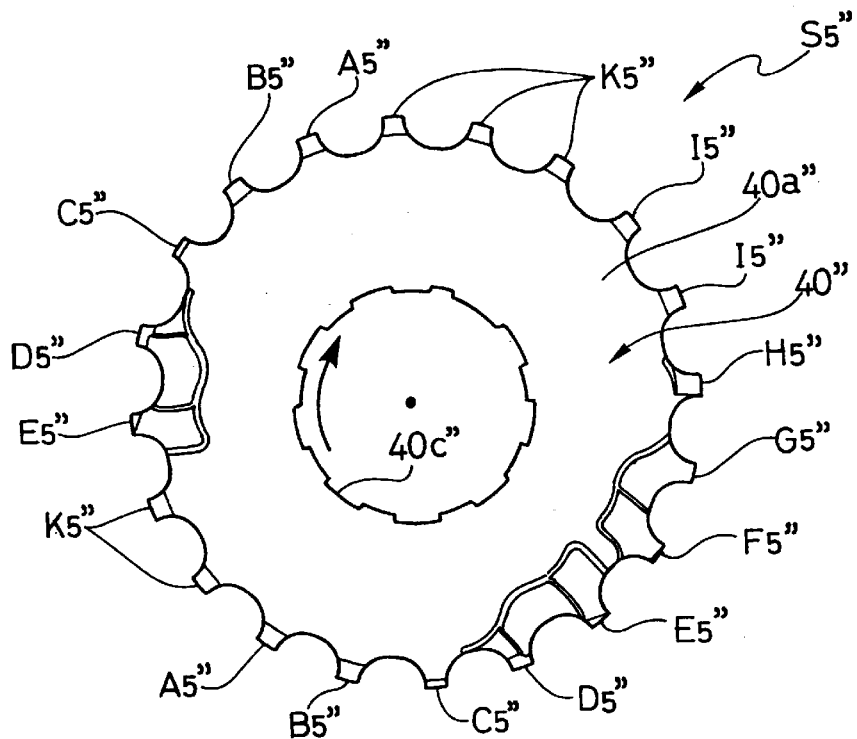
FIG. 40 is a small sprocket side elevational view of an even numbered teeth sprocket in accordance with the present invention.
Figure 41:
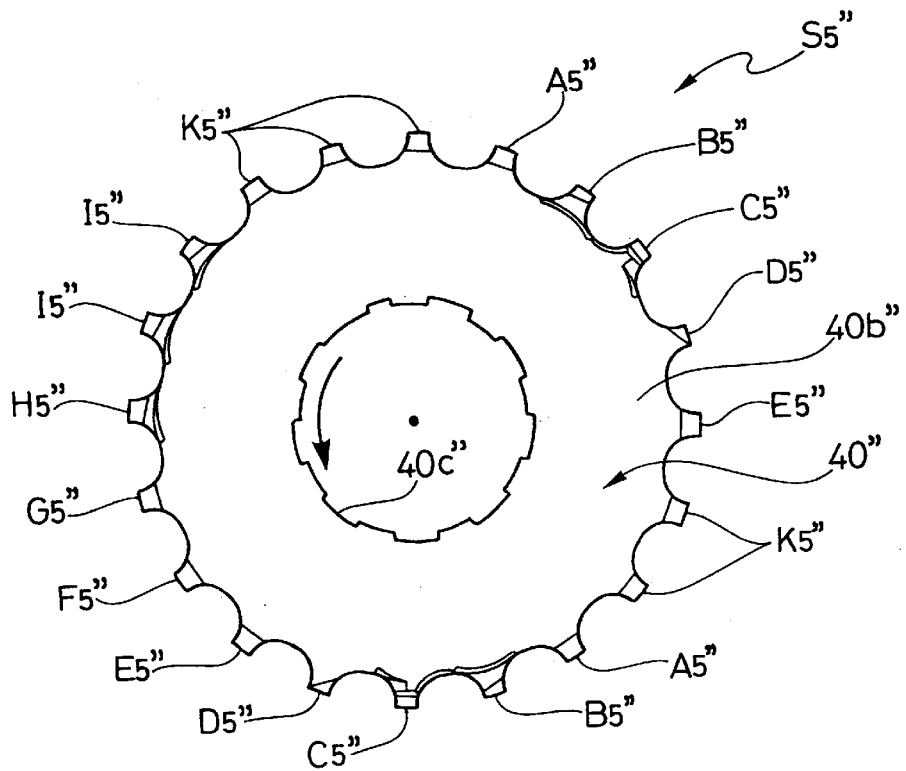
FIG. 41 is a large sprocket side elevational view of the even numbered teeth sprocket illustrated in FIG. 40.

Referring now to FIGS. 40 and 41, a sprocket $S_5''$ is illustrated in accordance with the present invention. The sprocket $S_5''$ utilizes the principles of the present invention as discussed relative to the sprockets $S_3$–$S_5$. In view of the similarity between this embodiment and the sprockets of the two prior embodiments, the teeth of this embodiment that have the same function as the teeth of the prior embodiment are given the identical referential numerals as the first embodiment but with a double prime (''). Thus, explanations of these similar teeth and their operations will be omitted from this embodiment.

The sprocket $S_5''$ can be used instead of either sprocket $S_5$ or $S_5'$ in the prior embodiments. The sprocket $S_5''$ basically has a sprocket body 40'' and a plurality (twenty) of circumferentially spaced teeth $A_5''$–$K_5''$ extending radially and outwardly from an outer periphery of the sprocket body 40''. Thus, the sprocket $S_5''$ has a total number of teeth equaling an even number. Since the sprocket $S_5''$ has an even number of teeth, the sprocket $S_5''$ has two sets of up shift teeth so that a pair of up shift paths are formed. The first set of up shift teeth forming the first up shift path is circumferentially spaced from the second set of up shift teeth forming the second up shift path. The spacing between the two up shift paths is such the only one of the up shift paths can be used depending on how the chain 23 was shifted onto the sprocket $S_5''$. In other words, only one of the second up shift teeth $B_5''$ will be engage with a pair of inner link plates 23a, while the other the second up shift teeth $B_5''$ will be engage with a pair of outer link plates 23b.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A sprocket for a multi-stage sprocket assembly of a bicycle comprising:
    a sprocket body having a first axial side and a second axial side; and
    a plurality of circumferentially spaced teeth extending radially and outwardly from an outer periphery of said sprocket body, said teeth including
        a plurality of up shift teeth including a first up shift tooth, a second up shift tooth located adjacent said first up shift tooth and a third up shift tooth located adjacent said second up shift tooth,
        said first, second and third up shift teeth being so dimensioned to maintain alignment of a bicycle chain to prevent an up shifting of the chain when an outer link plate of the bicycle chain meshes with said second up shift tooth, and to shift the bicycle chain when an inner link plate meshes with said second up shift tooth along a first up shift path.

2. A sprocket according to claim 1, wherein
    said first up shift tooth has a first flat up shift surface substantially aligned with said second axial side of said sprocket body,
    said second up shift tooth has a first up shift lean recess in said second axial side of said sprocket body, and
    said third up shift tooth has a second flat up shift surface substantially aligned with said second axial side of said sprocket body.

3. A sprocket according to claim 1, wherein
    said up shift teeth further includes a fourth up shift tooth located adjacent said third up shift tooth such that said first, second, third and fourth up shift teeth form said first up shift path.

4. A sprocket according to claim 3, wherein
    said first up shift tooth has a first flat up shift surface substantially aligned with said second axial side of said sprocket body,
    said second up shift tooth has a first up shift lean recess in said second axial side of said sprocket body,
    said third up shift tooth has a second flat up shift surface substantially aligned with said second axial side of said sprocket body, and
    said fourth up shift tooth has a second up shift recess in said first axial side of said sprocket body forming an inner link plate up shift guide surface.

5. A sprocket according to claim 1, wherein
    said first up shift tooth has a tip that extends substantially parallel to said first and second axial sides of said sprocket body.

6. A sprocket according to claim 5, wherein
    said tip of said first up shift tooth is centered between said first and second axial sides of said sprocket body.

7. A sprocket according to claim 5, wherein
    said tip of said first up shift tooth is offset towards one of said first and second axial sides of said sprocket body.

8. A sprocket according to claim 7, wherein
    said tip of said first up shift tooth is offset towards said first axial side of said sprocket body.

9. A sprocket according to claim 1, wherein
    said second up shift tooth has a tip that extends substantially parallel to said first and second axial sides of said sprocket body.

10. A sprocket according to claim 2, wherein
    said first up shift lean recess of said second up shift tooth is circumferentially slanted to become deeper as said first up shift lean recess approaches said third up shift tooth.

11. A sprocket according to claim 2, wherein
said outer periphery of said sprocket body defines a root diameter of said up shift teeth, and said first up shift lean recess of said second up shift tooth is located radially outward of said root diameter.

12. A sprocket according to claim 2, wherein
said third up shift tooth has a tip that extends substantially parallel to said first and second axial sides of said sprocket body.

13. A sprocket according to claim 12, wherein
said third up shift tooth has a radial height with an inner link plate sliding surface extending along approximately half of said radial height of said third up shift tooth on said second axial side of said sprocket body and being disposed radially outward of said second flat up shift surface.

14. A sprocket according to claim 2, wherein
said third up shift tooth has an inner link plate sliding surface disposed in said second axial side of said sprocket body and disposed radially outward of said second flat up shift surface.

15. A sprocket according to claim 1, wherein
said third up shift tooth has a first up shift surface substantially aligned with said first axial side of said sprocket body.

16. A sprocket according to claim 15, wherein
said third up shift tooth has a second up shift surface substantially aligned with said second axial side of said sprocket body.

17. A sprocket according to claim 16, wherein
said first up shift tooth has a third up shift surface substantially aligned with said first axial side of said sprocket body.

18. A sprocket according to claim 17, wherein
said first up shift tooth has a fourth up shift surface substantially aligned with said second axial side of said sprocket body.

19. A sprocket according to claim 2, wherein
said third up shift tooth has an outer link plate guide surface disposed in said second axial side of said sprocket body, said outer link plate guide surface slanting from said second flat up shift surface as said outer link plate guide surface approaches towards said first axial side of said sprocket body.

20. A sprocket according to claim 3, wherein
said third up shift tooth has a pitch formed between said third up shift tooth and said fourth up shift tooth that is larger than a pitch formed between said second up shift tooth and said third up shift tooth.

21. A sprocket according to claim 3, wherein
said fourth up shift tooth has an inner link plate guide surface formed at its tip and slanted radially inward from said tip of said fourth up shift tooth towards said first axial side of said sprocket body.

22. A sprocket according to claim 21, wherein
said fourth up shift tooth has an inner link plate escape recess formed on said first axial side of said sprocket body and located radially inward of said inner link plate guide surface.

23. A sprocket according to claim 22, wherein
said fourth up shift tooth has an up shift recess disposed on said first axial side of said sprocket body, said up shift recess of said fourth up shift tooth being deeper than said inner link plate escape recess relative to said first axial side of said sprocket body.

24. A sprocket according to claim 3, wherein
said fourth up shift tooth has an inner link plate escape recess formed on said first axial side of said sprocket body.

25. A sprocket according to claim 1, wherein
said teeth include a plurality of down shift teeth that are trimmed to form a first down shift path.

26. A sprocket according to claim 25, wherein
said first axial side of said sprocket body has a first down shift guide recess that extends along at least one of said down shift teeth.

27. A sprocket according to claim 26, wherein
said first axial side of said sprocket body has a second down shift guide recess that extends along at least one of said down shift teeth that is adjacent to said first down shift recess, said second down shift guide recess being deeper than said first down shift recess relative to said first axial side of said sprocket body.

28. A sprocket according to claim 27, wherein
said down shift teeth includes first, second and third down shift teeth that are consecutively arranged to form a part of said first down shift path and disposed behind said first and second down shift guide recesses relative to the direction of rotation.

29. A sprocket according to claim 25, wherein
said down shift teeth includes a first down shift tooth with a first down shift lean recess formed on said second axial side of said sprocket body.

30. A sprocket according to claim 29, wherein
said down shift teeth includes a second down shift tooth with a second down shift lean recess formed in said second axial side of said sprocket body, said second down shift tooth teeth being located adjacent said first down shift tooth.

31. A sprocket according to claim 30, wherein
said down shift teeth includes a third down shift tooth with a third down shift lean recess formed in said second axial side of said sprocket body, said third down shift tooth teeth being located adjacent said second down shift tooth.

32. A sprocket according to claim 31, wherein
said first axial side of said sprocket body has a first down shift guide recess that extends along said down shift teeth that is disposed adjacent and forward of said first down shift tooth relative to the direction of rotation.

33. A sprocket according to claim 32, wherein
said first axial side of said sprocket body has a second down shift guide recess that extends along at least one of said down shift teeth that is adjacent to said first down shift recess, said second down shift guide recess being deeper than said first down shift guide recess relative to said first axial side of said sprocket body.

34. A sprocket according to claim 25, wherein
said down shift teeth are disposed behind said up shift teeth relative to the direction of rotation.

35. A sprocket according to claim 25, wherein
said down shift teeth and said up shift teeth overlap such that at least one said up shift teeth also forms one of said down shift teeth.

36. A sprocket according to claim 35, wherein
two of said up shift teeth also form two of said down shift teeth.

37. A sprocket according to claim 36, wherein
said first up shift tooth and said second down shift tooth are formed as a first integrated tooth, and said second up shift tooth and said third down shift tooth are formed as a second integrated tooth.

38. A sprocket according to claim 37, wherein said first integrated tooth has a substantially radially extending edge that is substantially aligned with said second axial side of said sprocket body.

39. A sprocket according to claim 38, wherein said third up shift tooth has a flat up shift surface substantially aligned with a substantially radially extending edge that is substantially aligned with said second axial side of said sprocket body, and a slanted surface extending from said radially extending edge of said flat up shift surface to form a recess on said second axial side of said third up shift tooth.

40. A sprocket according to claim 1, wherein said up shift teeth further includes a second up shift path formed by an additional set of up shift teeth that are circumferentially spaced said up shift teeth forming said first up shift path.

41. A sprocket according to claim 40, wherein said sprocket body has a total number of said teeth equaling an even number.

42. A sprocket according to claim 40, wherein said teeth include a plurality of down shift teeth that are trimmed to form a pair of circumferentially spaced down shift paths.

43. A sprocket according to claim 1, wherein said sprocket body has a total number of said teeth equaling an odd number.

44. A sprocket for a multi-stage sprocket assembly of a bicycle comprising:

a sprocket body having a first axial side and a second axial side; and a plurality of circumferentially spaced teeth extending radially and outwardly from an outer periphery of said sprocket body, said teeth including a first shift tooth having a first inner link plate alignment surface substantially aligned with said second axial side of said sprocket body and a first down shift lean recess in said second axial side of said sprocket body, a second shift tooth having an up/down shift lean recess in said second axial side of said sprocket body and being disposed adjacent said first shift tooth in an opposite direction of rotation, a third tooth having a second inner link plate alignment surface substantially aligned with said second axial side of said sprocket body and being disposed adjacent said second shift tooth in an opposite direction of rotation, a fourth tooth having a first up shift recess in said first axial side of said sprocket body forming an inner link plate up shift guide surface and being disposed adjacent said third shift tooth in an opposite direction of rotation, a fifth tooth having a second down shift lean recess in said second axial side of said sprocket body and being disposed adjacent said first shift tooth in the direction of rotation, and said first, second, third and fourth shift teeth forming an up shift path and said first, second, and fifth shift teeth forming a down shift path.

45. A multi-stage sprocket assembly for a bicycle comprising:

a small sprocket having an outer periphery with a plurality of circumferentially spaced teeth; and a large sprocket disposed adjacent said small sprocket to rotate together in a direction of rotation, said large sprocket having a sprocket body with a first axial side and a second axial side, and a plurality of circumferentially spaced teeth extending radially and outwardly from an outer periphery of said sprocket body, said teeth of said large sprocket including a plurality of up shift teeth including a first up shift tooth, a second up shift tooth located adjacent said first up shift tooth and a third up shift tooth located adjacent said second up shift tooth, said first, second and third up shift teeth being so dimensioned to maintain alignment of a bicycle chain to prevent an up shifting of the chain when an outer link plate of the bicycle chain meshes with said second up shift tooth, and to shift the bicycle chain when an inner link plate meshes with said second up shift tooth along a first up shift path.

46. An automatic shifting assembly for a bicycle comprising:

an automatic shift control unit;

a speed sensing unit operatively coupled to said automatic shift control unit to provide a signal indicate a current speed;

a chain shifting device operatively coupled to said automatic shift control unit to move a chain in response to a shift signal from said automatic shift control unit; and a multi-stage sprocket assembly including a small sprocket having an outer periphery with a plurality of circumferentially spaced teeth, and a large sprocket disposed adjacent said small sprocket to rotate together in a direction of rotation, said large sprocket having a sprocket body with a first axial side and a second axial side, and a plurality of circumferentially spaced teeth extending radially and outwardly from an outer periphery of said sprocket body, said teeth of said large sprocket including a plurality of up shift teeth including a first up shift tooth, a second up shift tooth located adjacent said first up shift tooth and a third up shift tooth located adjacent said second up shift tooth, said first, second and third up shift teeth being so dimensioned to maintain alignment of a bicycle chain to prevent an up shifting of the chain when an outer link plate of the bicycle chain meshes with said second up shift tooth, and to shift the bicycle chain when an inner link plate meshes with said second up shift tooth along a first up shift path.

47. An automatic shifting assembly according to claim 46, wherein said chain shifting device is a motorized rear derailleur.

48. An automatic shifting assembly according to claim 46, wherein said speed sensing unit includes a magnet and a magnetically operable sensor.

* * * * *